United States Patent
Hetu et al.

(10) Patent No.: US 11,827,093 B2
(45) Date of Patent: Nov. 28, 2023

(54) CONTROL SYSTEMS AND THROTTLE ASSEMBLIES FOR VEHICLES HAVING HANDLEBARS

(71) Applicant: KA Group AG, Zürich (CH)

(72) Inventors: Jean-Francois Hetu, Trois-Rivières (CA); Lionel Thiebault, Shawinigan (CA)

(73) Assignee: KA Group AG, Zurich (CH)

( * ) Notice: Subject to any disclaimer, the term of this patent is extended or adjusted under 35 U.S.C. 154(b) by 726 days.

(21) Appl. No.: 16/625,412

(22) PCT Filed: Jul. 14, 2017

(86) PCT No.: PCT/IB2017/054288
§ 371 (c)(1),
(2) Date: Dec. 20, 2019

(87) PCT Pub. No.: WO2021/012319
PCT Pub. Date: Jan. 17, 2019

(65) Prior Publication Data
US 2020/0307376 A1    Oct. 1, 2020

(51) Int. Cl.
*B60K 26/02* (2006.01)
*B62K 11/14* (2006.01)
(Continued)

(52) U.S. Cl.
CPC .............. *B60K 26/02* (2013.01); *B62K 11/14* (2013.01); *B62K 23/06* (2013.01); *F16H 21/44* (2013.01)

(58) Field of Classification Search
None
See application file for complete search history.

(56) References Cited

U.S. PATENT DOCUMENTS 4,570,078 A    2/1986   Yashima et al.
5,078,023 A *  1/1992   Scarborough .......... B62K 23/06
                                                    74/489
(Continued)

FOREIGN PATENT DOCUMENTS

DE    4409251 C1    6/1995
DE    10055922 A1   5/2002
(Continued)

OTHER PUBLICATIONS

International Search Report for Application No. PCT/IB2017/054288 dated May 9, 2018, 5 pages.
(Continued)

*Primary Examiner* — Vicky A Johnson
(74) *Attorney, Agent, or Firm* — Howard & Howard Attorneys PLLC

(57) ABSTRACT

A throttle assembly (26) for a vehicle (20) having a handlebar (22) with a grip (36) extending along a grip axis (GA). A housing (42) is adapted for attachment to the handlebar (22) adjacent to the grip (36) and defines a housing axis (UA) adapted to be substantially parallel to the grip axis (GA). A link (48) is slidably supported by the housing (42) between a first link end (48A) and a second link end (48B). A thumb trigger (44) is coupled to the first link end (48A) and moves with the link (48) between first and second trigger positions (44A, 44B). A track mechanism (50) operatively attached to the housing (42) and to the second link end (48B) of the link (48) guides the link (48) along a curvilinear path (54A) such that movement of the thumb trigger (44) to the second trigger position (44B) slides the thumb trigger (44) away from the housing (42) with the thumb trigger (44) traversing the housing axis (UA) during at least a portion of the movement between the first and second trigger positions (44A, 44B).

31 Claims, 33 Drawing Sheets

(51) Int. Cl.
 *B62K 23/06* (2006.01)
 *F16H 21/44* (2006.01)

(56) References Cited

U.S. PATENT DOCUMENTS

| | | | |
|---|---|---|---|
| 5,871,202 | A | 2/1999 | Taomo et al. |
| 6,276,230 | B1 | 8/2001 | Crum et al. |
| 6,658,965 | B2 | 12/2003 | Allen |
| 7,581,464 | B2 | 9/2009 | Munz |
| 7,735,392 | B2 * | 6/2010 | Poulos, Jr. ............ B62K 23/04 74/502.2 |
| 7,806,023 | B2 | 10/2010 | Fowler |
| 8,082,819 | B2 * | 12/2011 | Case ..................... B62K 23/06 74/489 |
| 8,256,323 | B2 | 9/2012 | Vellutini |
| 8,887,594 | B2 | 11/2014 | Ruth |
| 9,533,571 | B1 | 1/2017 | Urmosi |
| 2007/0137408 | A1 | 6/2007 | Lassiter |
| 2009/0013816 | A1 | 1/2009 | Munz |
| 2010/0038166 | A1 | 2/2010 | Chandran et al. |

FOREIGN PATENT DOCUMENTS

| | | |
|---|---|---|
| EP | 0790176 A1 | 8/1997 |
| EP | 2079630 A2 | 7/2009 |
| EP | 2687432 A1 | 1/2014 |
| GB | 330353 A | 6/1930 |
| JP | 2005212661 A | 8/2005 |
| WO | 9964290 A1 | 12/1999 |
| WO | 2008047056 A2 | 4/2008 |

OTHER PUBLICATIONS

Invitation to Pay Additional Fees/Partial International Search Report for Application No. PCT/IB2017/054288 dated Mar. 20, 2018, 4 pages.

Heinrich Kipp Werk, "K0582 Spring Plungers with Detent Ring Webpage", https://www.kipp.com/gb/en/products/operating-parts-standard-elements/spring-plungers-indexing-plungers-ball-lock-pins/K0582-Spring-plungers-with-adhesive-ring.html#, 2017, 2 pages.

English language abstract for DE 44 09 251 C extracted from espacenet.com database on Mar. 14, 2020, 1 page.

English language abstract for DE 100 55 922 A1 extracted from espacenet.com database on Mar. 14, 2020, 1 page.

English language abstract for JP 2005-212661 A extracted from espacenet.com database on Mar. 14, 2020, 1 page.

English language abstract for WO 2008/047056 A2 extracted from espacenet.com database on Mar. 14, 2020, 1 page.

* cited by examiner

CONTROL SYSTEMS AND THROTTLE ASSEMBLIES FOR VEHICLES HAVING HANDLEBARS

The subject application is the National Stage of International Patent Application No. PCT/IB2017/054288, filed on Jul. 14, 2017, the contents of which are incorporated herein by reference in their entirety.

BACKGROUND OF THE INVENTION

1. Field of the Invention

The present invention relates, generally, to throttle assemblies for vehicles and, more specifically, to control systems and throttle assemblies for vehicles having handlebars.

2. Description of the Related Art

Conventional throttle assemblies known in the art are employed to allow a driver to selectively control operation of a vehicle. To this end, throttle assemblies are used to control vehicle acceleration and modulate vehicle speed, such as by regulating airflow into an internal combustion engine which generates rotational torque used to propel the vehicle. In certain types of vehicles, such as those utilized in the recreational and/or power sports industries, the throttle assembly is arranged for actuation by one of the driver's hands and is mounted on a handlebar also used to steer the vehicle such that the driver can simultaneously control steering and acceleration.

Those having ordinary skill in the art will appreciate that throttle assemblies used in connection with handlebar-equipped vehicles are frequently configured for "twisting" actuation. Such "twist" style throttle assemblies comprise a grip which can rotate relative to the handlebar to regulate vehicle speed while also providing support to the driver's hand during vehicle operation. However, depending on the type of vehicle, how the vehicle is used, and the preferences of the driver, "twist" style throttle assemblies may be undesirable. By way of non-limiting example, because the driver is holding onto a rotatable grip, excessive vehicle movement may result in undesired vehicle acceleration or deceleration caused by grip rotation as the driver's body moves relative to the vehicle. In some applications, such as those where "twist" throttle assemblies are undesirable, vehicles may employ finger-actuated or thumb-actuated throttle assemblies. Here, the throttle assembly comprises a lever positioned next to a non-rotating grip such that the driver can simultaneously grasp the grip and use their thumb or one of their fingers to actuate the lever to regulate vehicle speed With certain types of vehicles, such as all-terrain vehicles, dirt bikes, snowmobiles, personal watercraft, and the like, the driver (also sometimes referred to as the "operator" or the "rider") may transition between various positions during operation. By way of example, the driver may frequently switch between riding and seated positions to improve visibility, enhance comfort, transfer weight on the vehicle, and the like. Here, it will be appreciated that changing between positions on handlebar-equipped vehicles generally necessitates that the driver also adjust the throttle assembly or otherwise compensate for the positon change to ensure proper operation of the throttle assembly. By way of non-limiting example, if the driver moves from sitting to standing while on a vehicle with a "twist" throttle assembly, the transition to standing has a tendency to rotate the grip and cause deceleration. Thus, the driver generally has to compensate for this rotation by adjusting their hand position, which may be disadvantageous under certain operating conditions.

While the effect described above in connection with "twist" throttle assemblies is less pronounced with "lever" style throttle assemblies, changing between different positions may still strain the driver's wrist, hands, fingers, and the like. Furthermore, transitioning between sitting and standing often results in a significant change in the orientation of the driver's arms relative to the handlebars, which may complicate operation of certain types of conventional "lever" style throttle assemblies. By way of illustration, while seated on an all-terrain vehicle, the driver's arms generally extend forward toward the handlebars, whereas during standing the driver's arms extend downward. In applications where changing positions necessitates a significant reorientation of hand and/or wrist position, it will be appreciated that positioning "lever" style throttle assemblies for consistent driver access may be cumbersome. In order to mitigate this effect, conventional "lever" style throttle assemblies tend to employ relatively large levers designed to help promote accessibility while the driver is in different positions. While these types of throttle assemblies afford certain advantages over "twist" style throttle assemblies, they tend to be relatively bulky, expensive to manufacture, and difficult to adjust or otherwise reposition to accommodate different drivers.

While conventional throttle assemblies have generally performed well for their intended use, there remains a need in the art for a throttle assembly which can operate consistently and reliably when used in in connection with different types of vehicles, which afford comfort and consistent accessibility in a variety of different driving positions, and which can be manufactured and assembled in an efficient and cost-effective manner while, at the same time, affording minimal packaging size and component weight.

SUMMARY OF THE INVENTION AND ADVANTAGES

The present invention overcomes the disadvantages in the prior art in a throttle assembly for a vehicle having a handlebar with a grip coupled to the handlebar and extending along a grip axis. The throttle assembly includes a housing having a mount adapted for attachment to the handlebar adjacent to the grip. At least a portion of the housing defines a housing axis adapted to be substantially parallel to the grip axis. A link is slidably supported by the housing and extends between a first link end and a second link end. A thumb trigger is coupled to the first link end and concurrently moves with the link between a first trigger position and a second trigger position. A track mechanism is operatively attached to the housing and to the second link end of the link. The track mechanism guides the link along a curvilinear path such that movement of the thumb trigger from the first trigger position to the second trigger position slides the thumb trigger away from the housing with the thumb trigger traversing the housing axis during at least a portion of the movement between the first and second trigger positions.

In addition, the present invention is directed toward a throttle assembly for a vehicle having a handlebar with a grip coupled to the handlebar and extending along a grip axis. The throttle assembly includes a housing having a mount adapted for attachment to the handlebar adjacent the grip. A link is slidably supported by the housing and extends along a link axis between a first link end and a second link end. A thumb trigger is coupled to the first link end and concurrently moves with the link between a first trigger position and a second trigger position. A track mechanism is operatively attached to the housing and to the second link end of the link. The track mechanism includes a track member operatively attached to the housing and defining a slot, and a slider operatively attached to the second link end of the link and engaging the slot to guide the second link end as the thumb trigger moves between the first and second trigger positions and to restrict rotation of the link about the link axis as the thumb trigger moves between the first and second trigger positions.

Furthermore, the present invention is directed toward a control system for a vehicle having a handlebar extending along a handlebar axis to a handlebar end. The control system includes a first grip element adapted for attachment to the handlebar adjacent to the handlebar end. The first grip element defines a grip axis. A second grip element adapted for rotatable attachment to the handlebar can rotate about the grip axis relative to the first grip element between a first riding position and a second riding position. A throttle assembly having a housing and a trigger is provided. The trigger is movable relative to the housing between a first trigger position and a second trigger position. The housing is operatively attached to the second grip element and concurrently rotates with the second grip element between the first and second riding positions. The trigger is movable between the first and second trigger positions independent of rotation between the first and second riding positions.

In addition, the present invention is directed toward a method of operating a vehicle having a handlebar, with a first grip element, a second grip element, and a throttle assembly having a housing and a trigger to operate the vehicle. The method includes the steps of: moving the trigger relative to the housing between a first trigger position and a second trigger position while the second grip element is positioned relative to the first grip element in a first riding position; and rotating the second grip element, the housing, and the trigger relative to the first grip element from the first riding position to a second riding position independent of movement of the trigger between the first and second trigger positions.

In this way, the throttle assemblies, control system, and method of the present invention afford improved functionality and usability in connection with handlebar-equipped vehicles while, at the same time, reducing the cost and complexity of manufacturing and assembling throttle assemblies which can operate reliably and predictably in a number of different operating conditions.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Figure 1:
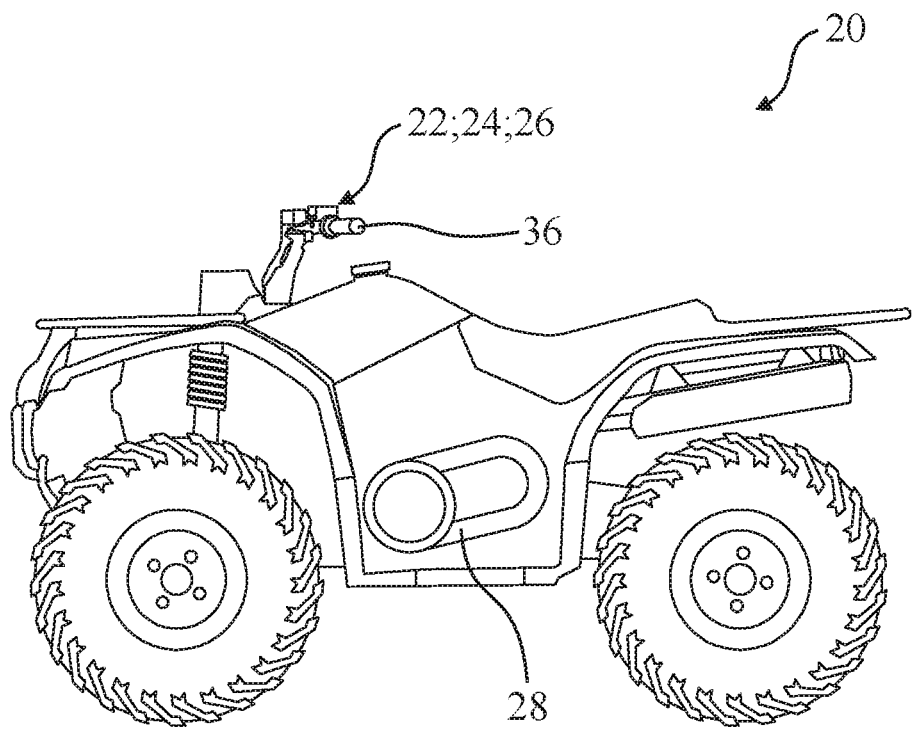
FIG. 1 is left-side plan view of a vehicle having handlebars and a control system with a throttle assembly according to embodiments of the present invention.
Figure 2A:
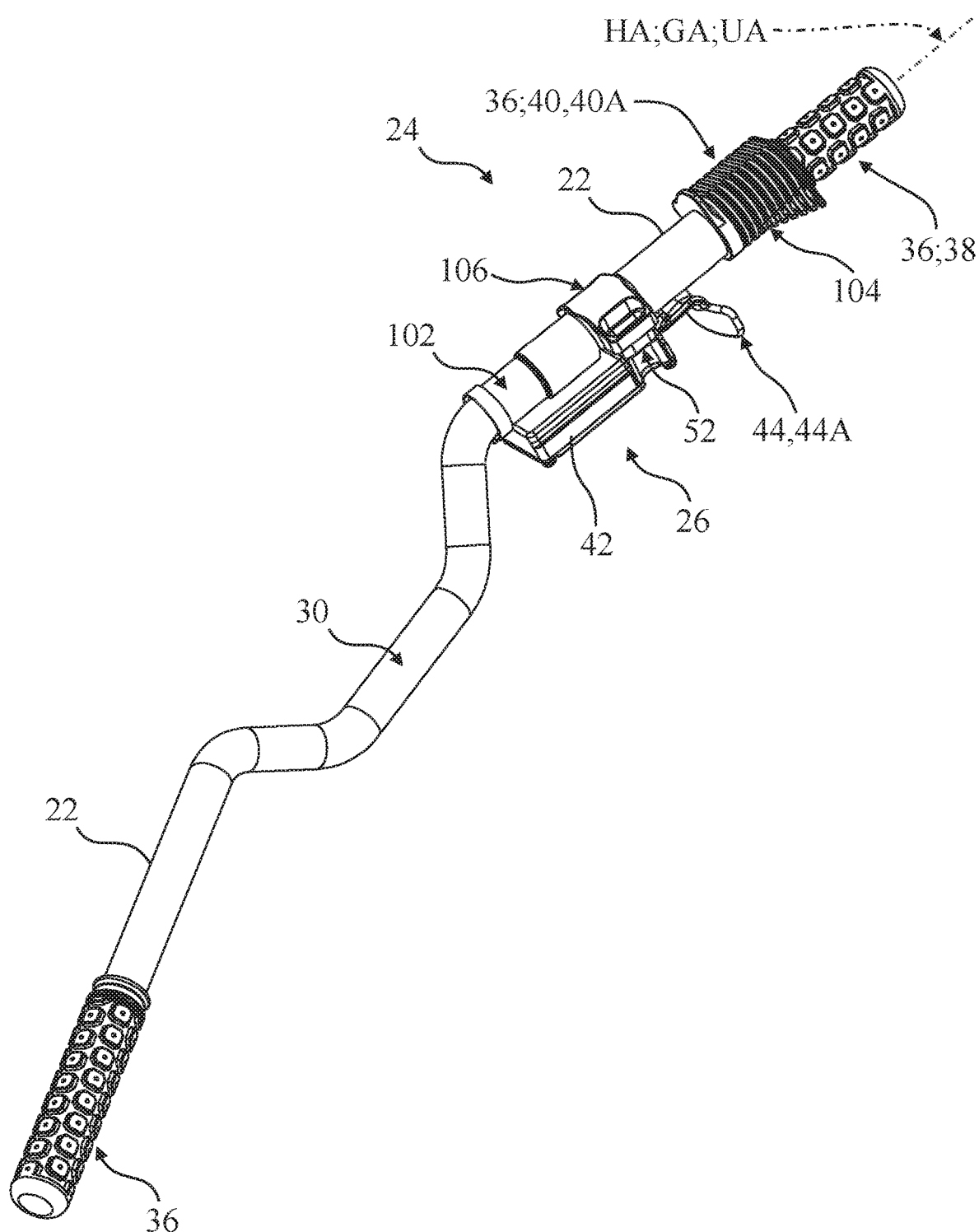
FIG. 2A is a perspective view of control system of the vehicle of FIG. 1, shown having a first grip element adapted for attachment to a handlebar end and a second grip element adapted for rotatable attachment to the handlebar and supporting the throttle assembly in a first riding position, with the throttle assembly shown having a thumb trigger arranged in a first trigger position.
Figure 2B:
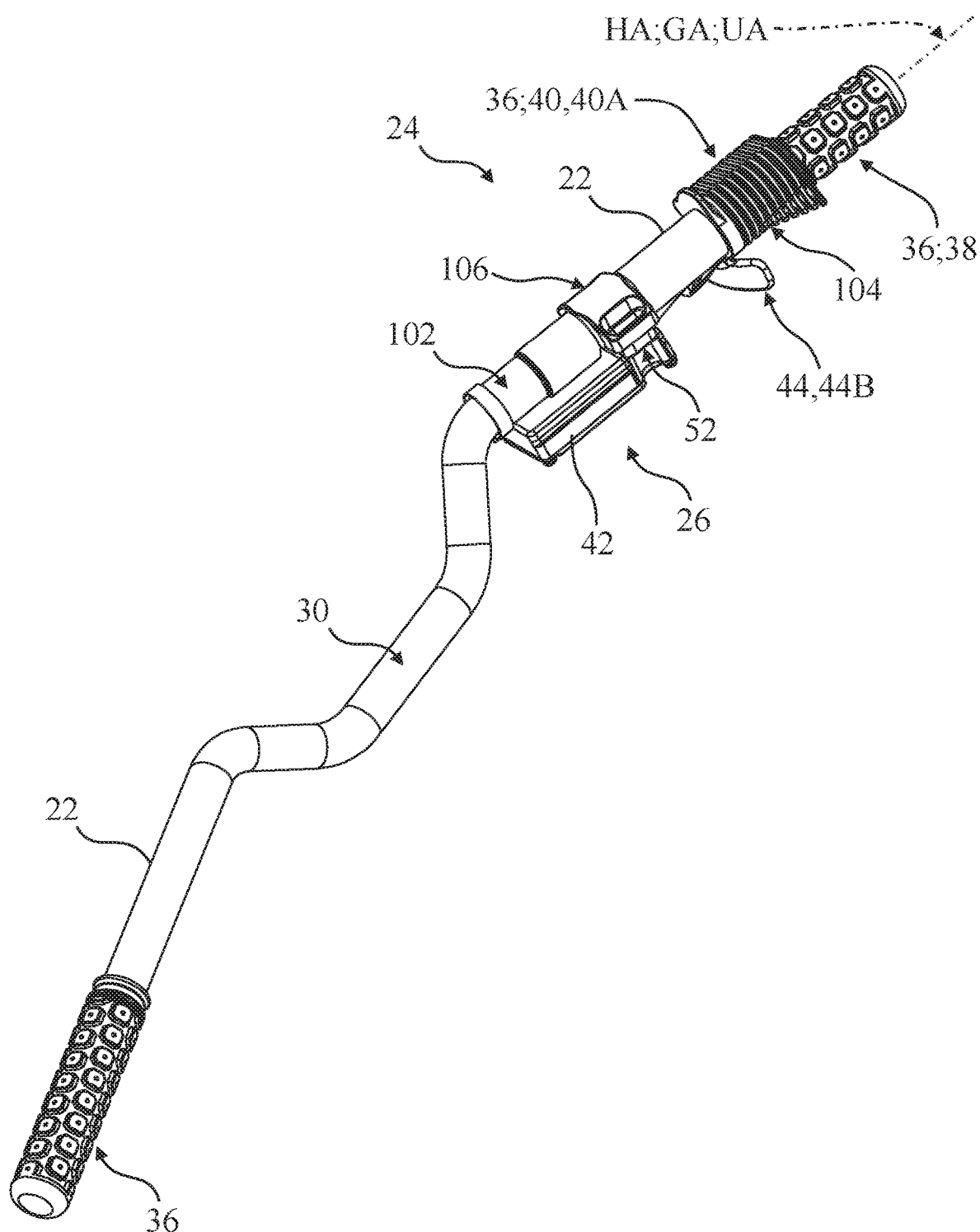
FIG. 2B is another perspective view of the control system of FIG. 2A, shown with the thumb trigger of the throttle assembly arranged in a second trigger position and with the second grip element arranged in the first riding position.
Figure 2C:
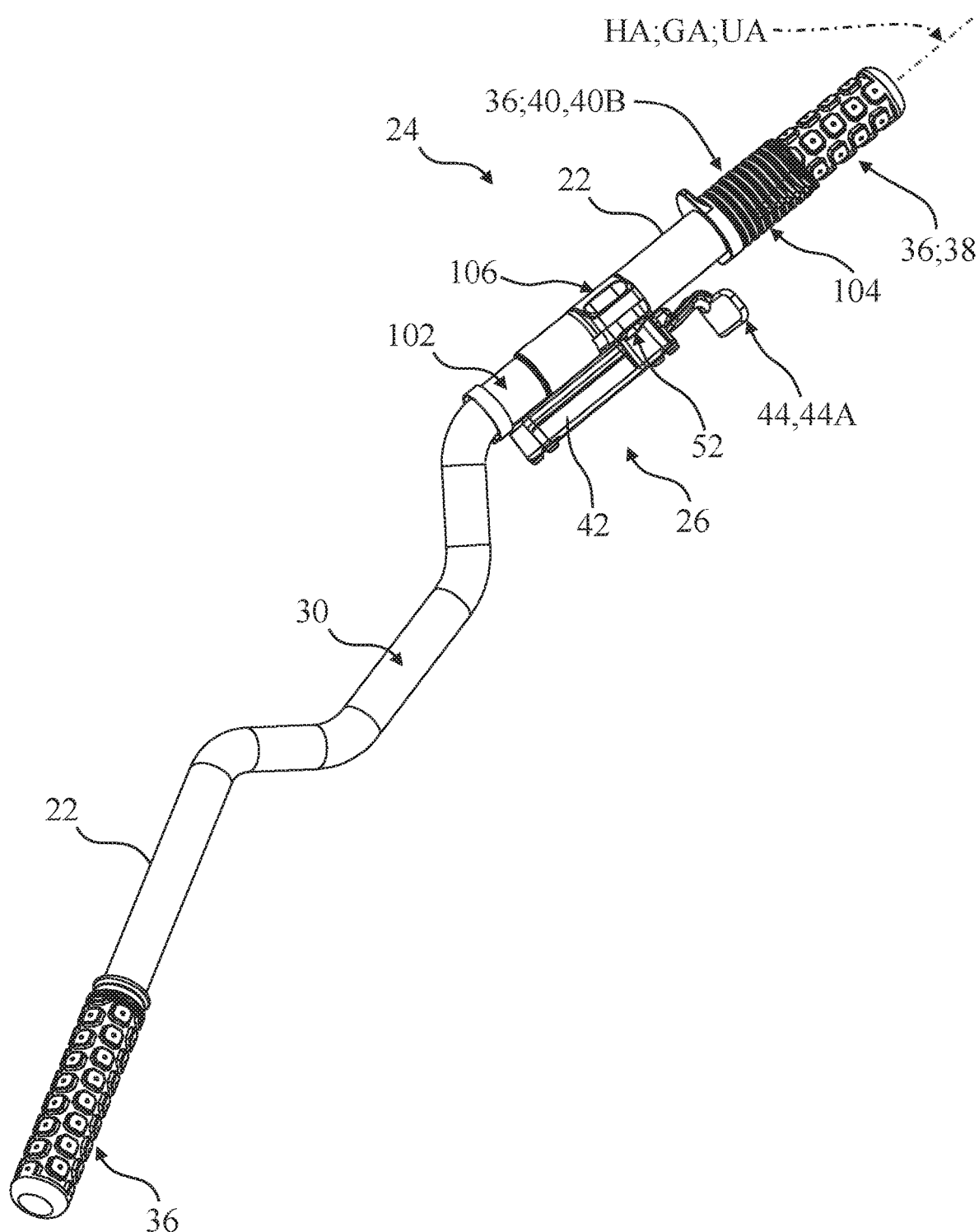
FIG. 2C is another perspective view of the control system of FIG. 2B, shown with the thumb trigger of the throttle assembly arranged in the first trigger position and with the second grip element arranged in a second riding position.
Figure 2D:
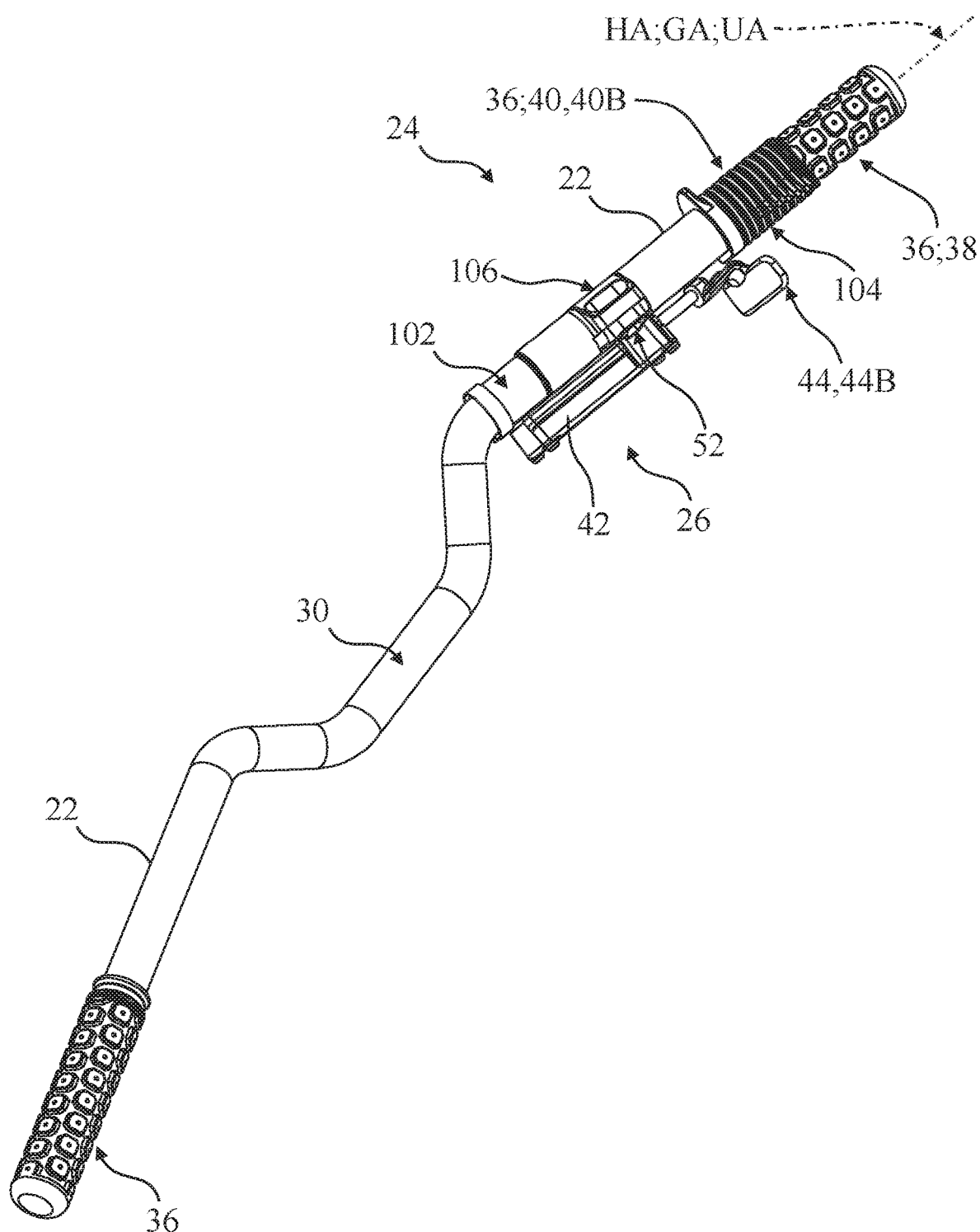
FIG. 2D is another perspective view of the control system of FIG. 2C, shown with the thumb trigger of the throttle assembly arranged in the second trigger position and with the second grip element arranged in the second riding position.

Referring now to the drawings, where like numerals indicate like or corresponding parts throughout the several views, a vehicle is generally shown at 20 in FIG. 1. The vehicle 20 comprises handlebars 22 arranged to be grasped by a rider (sometimes called an "operator" or a "driver") of the vehicle 20. The handlebars 22 provide support to the rider's hands and allow the rider to steer the vehicle 20 during use. The handlebars 22 also support various components of a control system, generally indicated at 24 in FIG. 1, according to embodiments of the present invention. As is described in greater detail below, the control system 24 comprises a throttle assembly, generally indicated at 26, which is adapted to enable the rider to control acceleration and modulate vehicle speed, such as by regulating airflow into an internal combustion engine 28 which generates rotational torque used to propel the vehicle 20 in operation. However, those having ordinary skill in the art will appreciate that the throttle assembly 26 could be used to facilitate control of vehicles 20 which utilize different types of powertrains, such as electric powertrains, hybrid powertrains, and the like.

While the vehicle 20 depicted in FIG. 1 is realized as an all-terrain vehicle, it will be appreciated that the vehicle 20 could be of any suitable type or configuration which employs handlebars 22 to facilitate steering, or which could otherwise utilize hand-operated throttle controls. By way of non-limiting illustration, the vehicle 20 could similarly be realized as a dirt bike, a motorcycle, a personal watercraft, a snowmobile, and the like configured for use in a number of different industries and environments, including recreational use, power sports and racing, commercial use, general transportation, and the like. Thus, those having ordinary skill in the art will appreciate that the vehicle 20 does not form part of the present invention and could be of a number of different types or configurations.

Referring now to FIGS. 2A-2D, the handlebars 22, the control system 24, and the throttle assembly 26 are shown in greater detail. In the illustrated embodiment, the handlebars 22 are defined by a single handlebar assembly 30, which is formed as a unitary, one-piece component, such as from a cylindrical tube which is bent or otherwise formed to shape. However, those having ordinary skill in the art will appreciate that the handlebars 22 could be formed separately from each other, such as by "clip-on" handlebars. Other configurations are contemplated. Each of the handlebars 22 of the handlebar assembly 30 is defined by a generally straight, cylindrical region 32 which extends to a discrete handlebar end 34 to which a grip 36 is secured (see FIGS. 3-4). The grips 36 provide the rider a place to position their hands to steer the vehicle 20 and afford support to the rider during use. In the illustrated embodiment, the control system 24 and the throttle assembly 26 are operatively attached to the handlebar 22 so as to be engaged by the rider's right hand, as is convention.

As is depicted in FIGS. 2A-2D, the cylindrical region 32 of the handlebar 22 on the right side of the handlebar assembly 30 defines a handlebar axis HA, and the grip 36 coupled to the handlebar end 34 defines a grip axis GA. In the representative embodiment illustrated herein, the grip axis GA is aligned with the handlebar axis HA. As will be appreciated from the subsequent description below, the grip axis GA and the handlebar axis HA are used herein to describe movement and operation of the control system 24 and/or the throttle assembly 26. Because certain embodiments of the present invention do not include the handlebars 32 and/or parts of the grips 36, it will be appreciated that the handlebar axis HA, the grip axis GA, the handlebars 32, and/or the grips 36 can be configured and/or defined in a number of different ways. Specifically, while the handlebar axis HA and the grip axis GA are depicted as a single, straight line throughout the drawings, it will be appreciated that these axes HA, GA, could be arranged or defined differently without departing from the scope of the present invention. By way of illustration, the handlebar could comprise a curved region adjacent to the handlebar end with a grip coupled to the curved region (not shown), and the "handlebar axis" and/or the "grip axis" could be defined by a curved path defined by or otherwise aligned to the curved region of the handlebar.

Figure 14A:
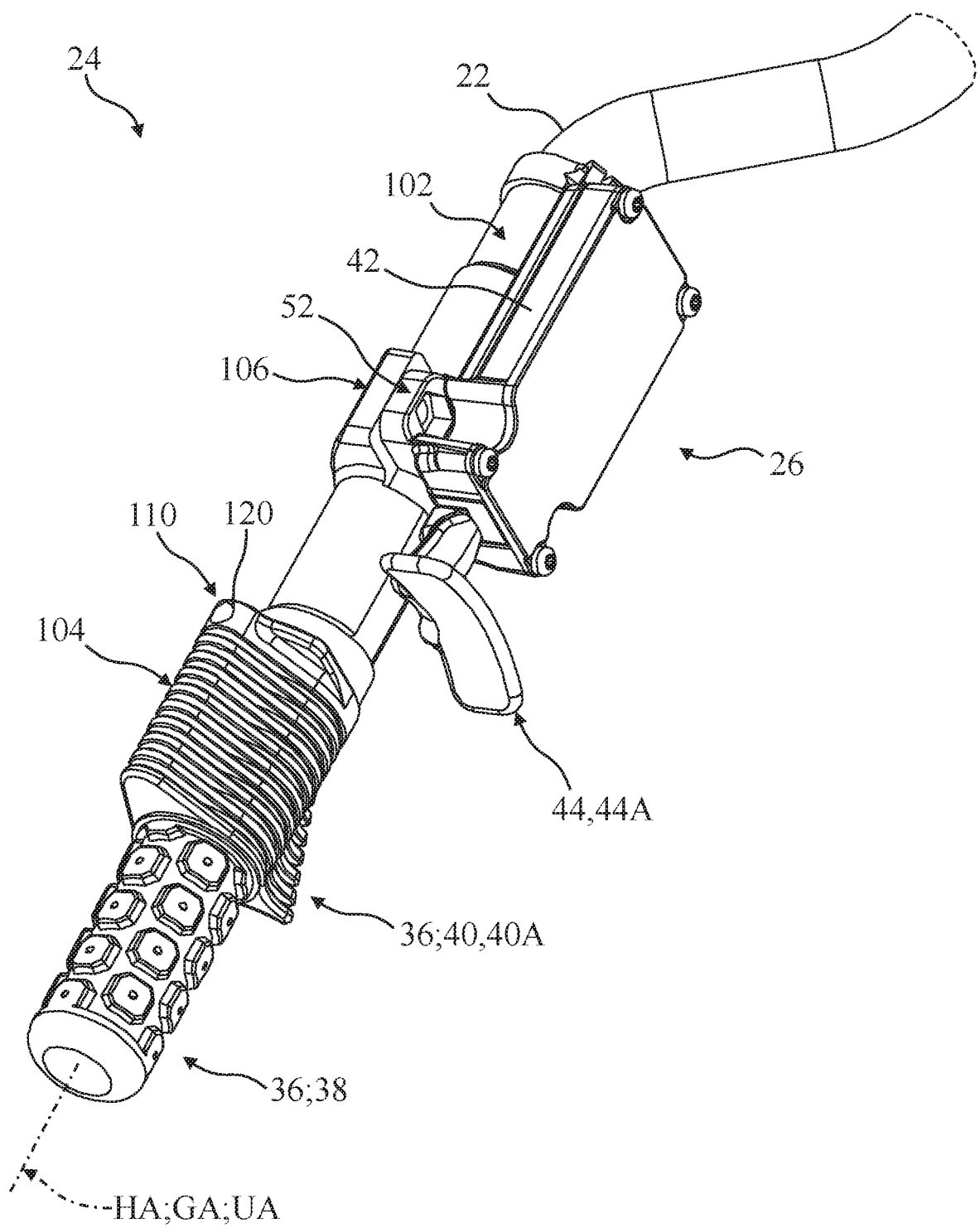
FIG. 14A is a partial perspective view of the control system of FIG. 13, shown with the thumb trigger arranged in the first trigger position and with the second grip element arranged in the first riding position.
Figure 14B:
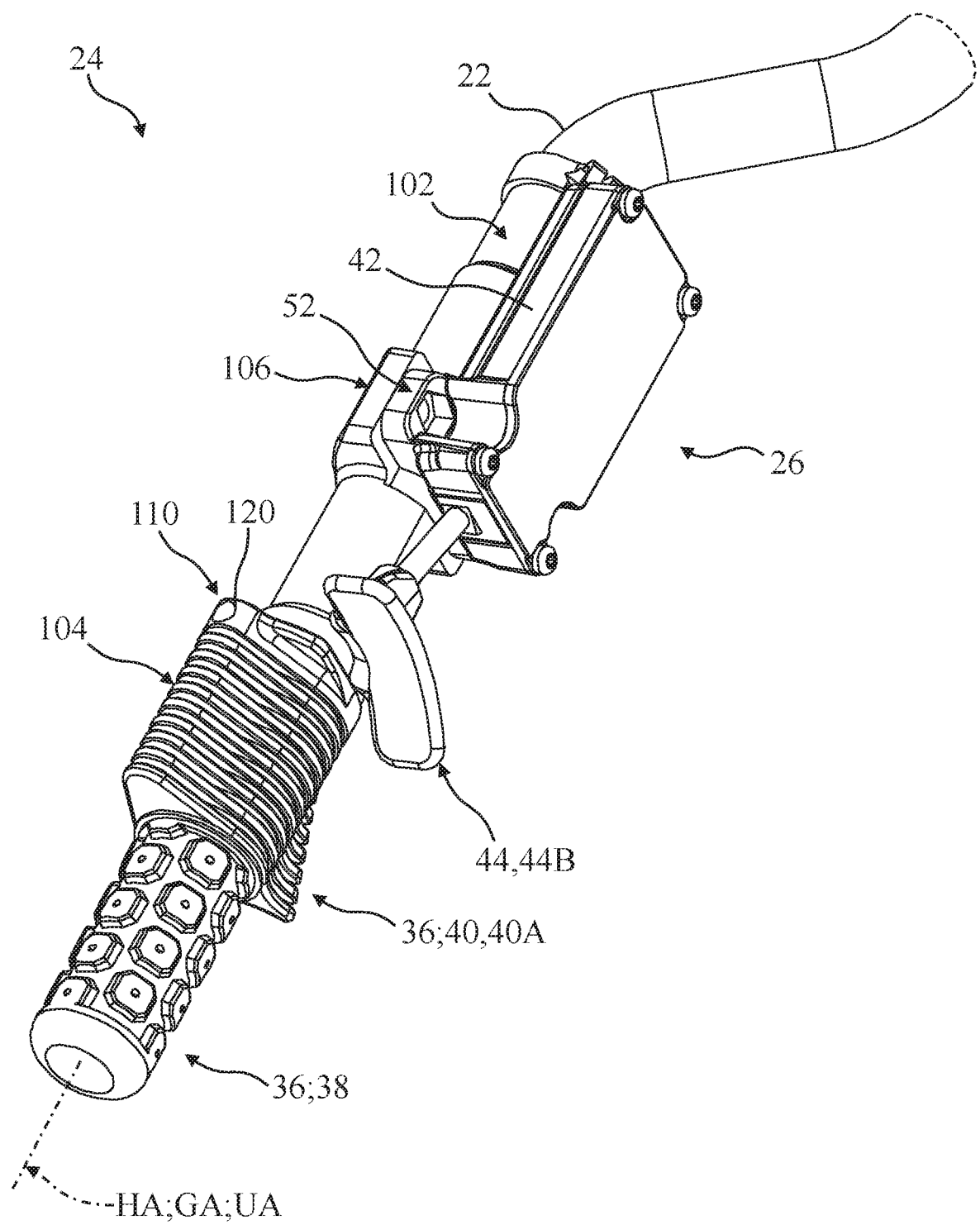
FIG. 14B is another partial perspective view of the control system of FIG. 14A, shown with the thumb trigger arranged in the second trigger position and with the second grip element arranged in the first riding position.
Figure 14C:
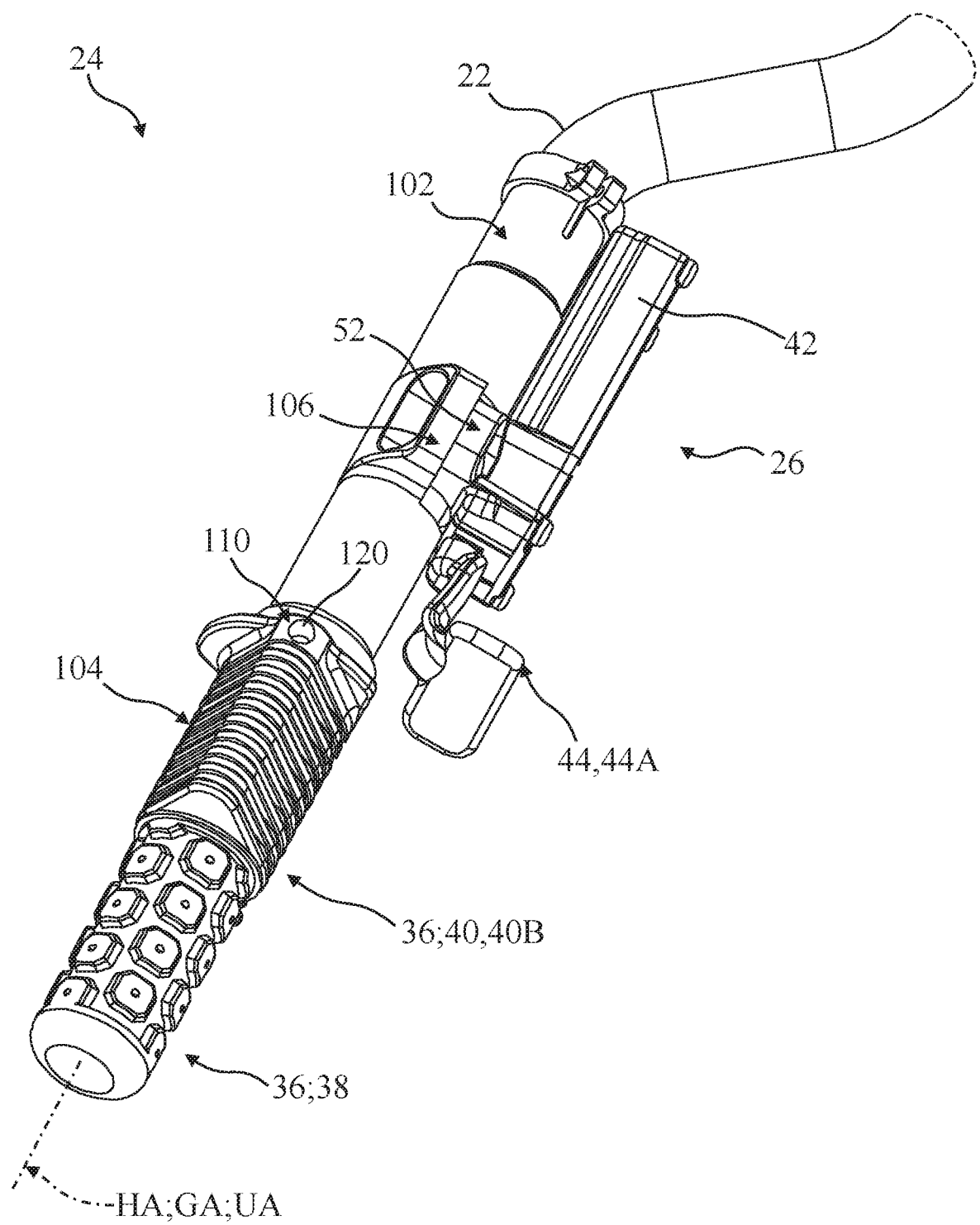
FIG. 14C is another partial perspective view of the control system of FIG. 14B, shown with the thumb trigger arranged in the first trigger position and with the second grip element arranged in the second riding position rotated relative to the first grip element with the throttle assembly.
Figure 14D:
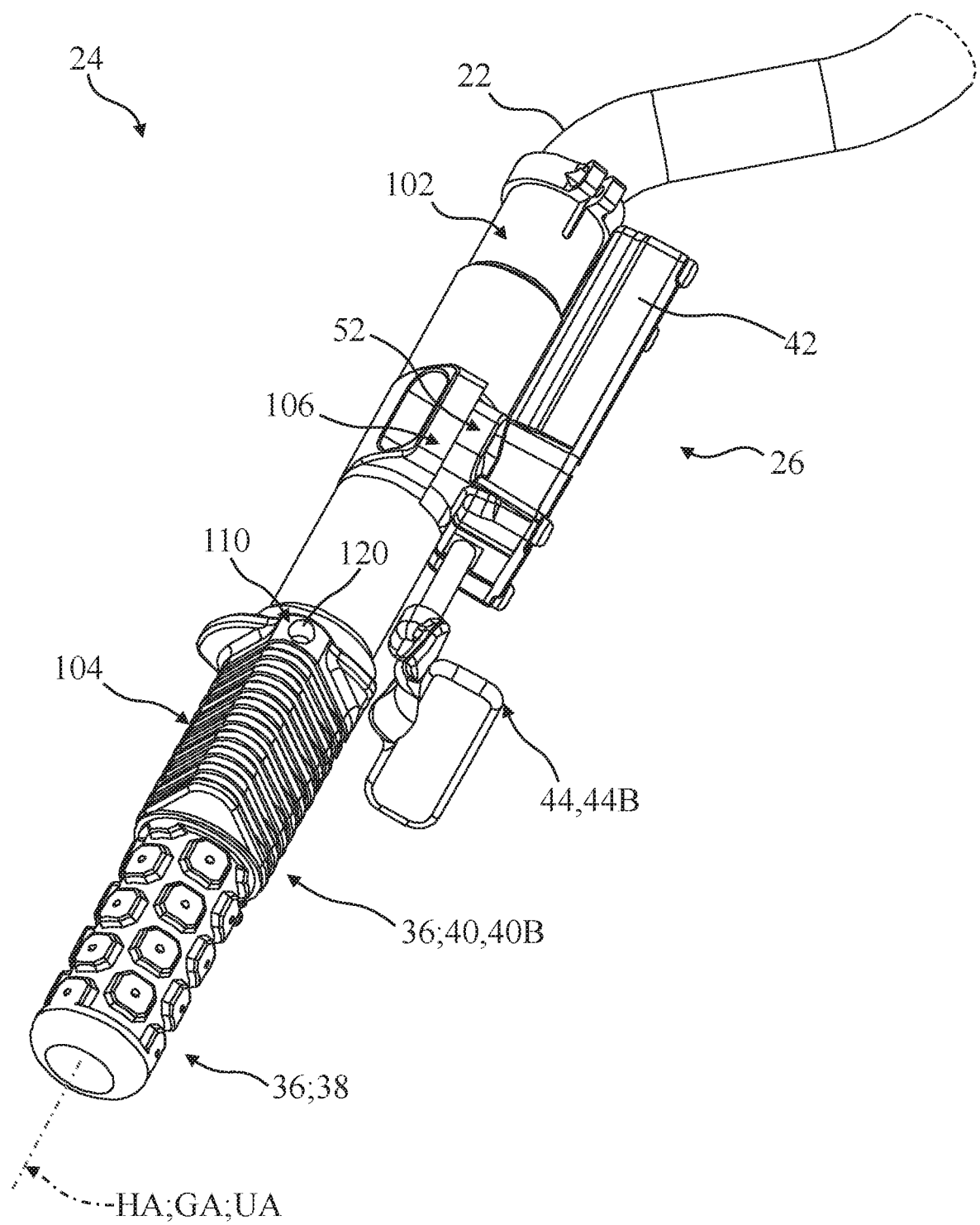
FIG. 14D is another partial perspective view of the control system of FIG. 14C, shown with the thumb trigger arranged in the second trigger position and with the second grip element arranged in the second riding position.
Figure 15:
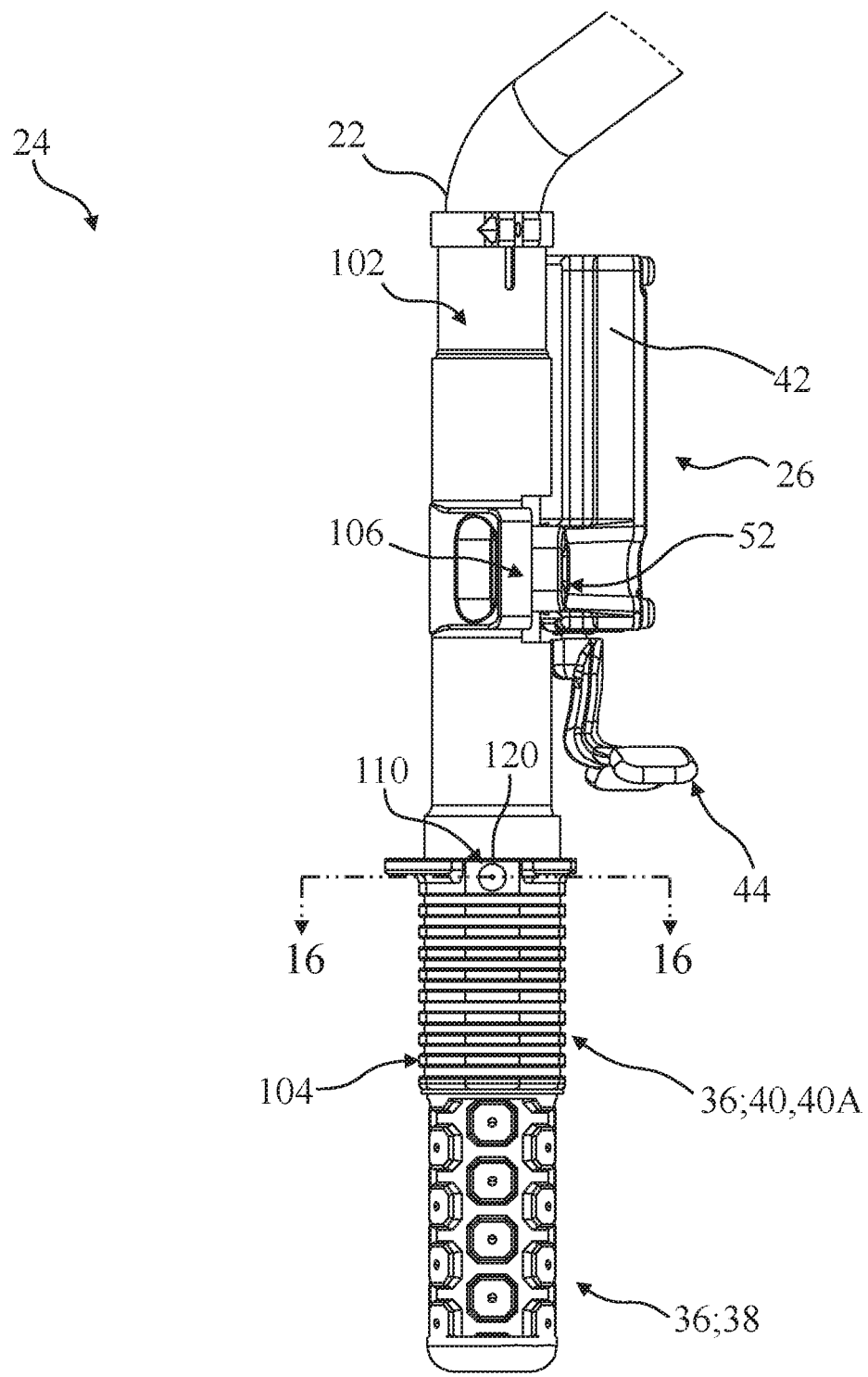
FIG. 15 is a partial top-side plan view of the control system of FIGS. 13-14D.

As will be appreciated from the subsequent description of the control system 24 below, the grip 36 coupled to the handlebar end 34 of the left handlebar 22 does not generally rotate and, thus, could be of a number of different types and configurations sufficient to provide support to the rider's left hand. Conversely, parts of the grip 36 coupled to the right handlebar 22 form part of the control system 24 in certain embodiments of the present invention, such as those described in greater detail below in connection with FIGS. 2A-2D and 14A-14D. In these embodiments, the grip 36 of the right handlebar 22 is defined by a first grip element 38 and a second grip element 40. The first grip element 38 is adapted for attachment to the handlebar 22 adjacent to the handlebar end 34 and defines the grip axis GA. The first grip element 38 provides support to the rider's right hand in operation and does not rotate relative to the grip axis GA (or, the handlebar axis HA). Conversely, the second grip element 40 is adapted for rotatable attachment to the handlebar 22 and is rotatable about the grip axis GA (or, the handlebar axis HA) relative to the first grip element 38, concurrently with the throttle assembly 26, between a first riding position 40A (see FIGS. 2A-2B; see also FIGS. 14A-14B) and a second riding position 40B (see FIGS. 2C-2D; see also FIGS. 14C-14D). The first grip element 38, the second grip element 40, the first riding position 40A, and the second riding position 40B will each be described in greater detail below.

Referring now to FIGS. 2A-9E, as is described in greater detail below, the throttle assembly 26 comprises a housing 42 and a thumb trigger 44 that is movable relative to the housing 42 between a first trigger position 44A (see FIG. 2A; see also FIGS. 2C, 9A, 14A, and 14C) and a second trigger position 44B (see FIG. 2B; see also FIGS. 2D, 9E, 14B, and 14D). The throttle assembly 26 is realized as a "drive-by-wire," electronic throttle assembly 26 configured to communicate electrical signals to a controller, depicted schematically at 46 in FIG. 7 (for example, an "electronic control unit"), where the electrical signals are representative of the relative position of the thumb trigger 44 between the trigger positions 44A, 44B. The controller 46, in turn, is responsive to the electrical signals and can adjust operation of the engine 28 of the vehicle 20 in response. By way of non-limiting example, the engine 28 could comprise a motor-driven throttle valve (not shown) driven by the controller 46 to regulate airflow into the engine 28, and the controller 46 could be configured to close the throttle valve when the thumb trigger 44 is in the first trigger position 44A (see FIG. 2A) and to drive the throttle valve fully open when the thumb trigger 44 is in the second trigger position 44B (see FIG. 2B). Put differently, the first trigger position 44A could represent "idle," the second trigger position 44B could represent "wide-open throttle," and the trigger 44 could be movable to a number of different positions between the first and second trigger positions 44A, 44B. It will be appreciated that electrical communication between the throttle assembly 26 and the controller 46 can be achieved in a number of different ways without departing from the scope of the present invention. Moreover, while the representative embodiment of the throttle assembly 26 depicted herein is realized as an electronic "drive-by-wire" throttle assembly 26, it will be appreciated that the a "cable-driven" arrangement could be utilized in certain embodiments without departing from the scope of the present invention.

Figure 6:
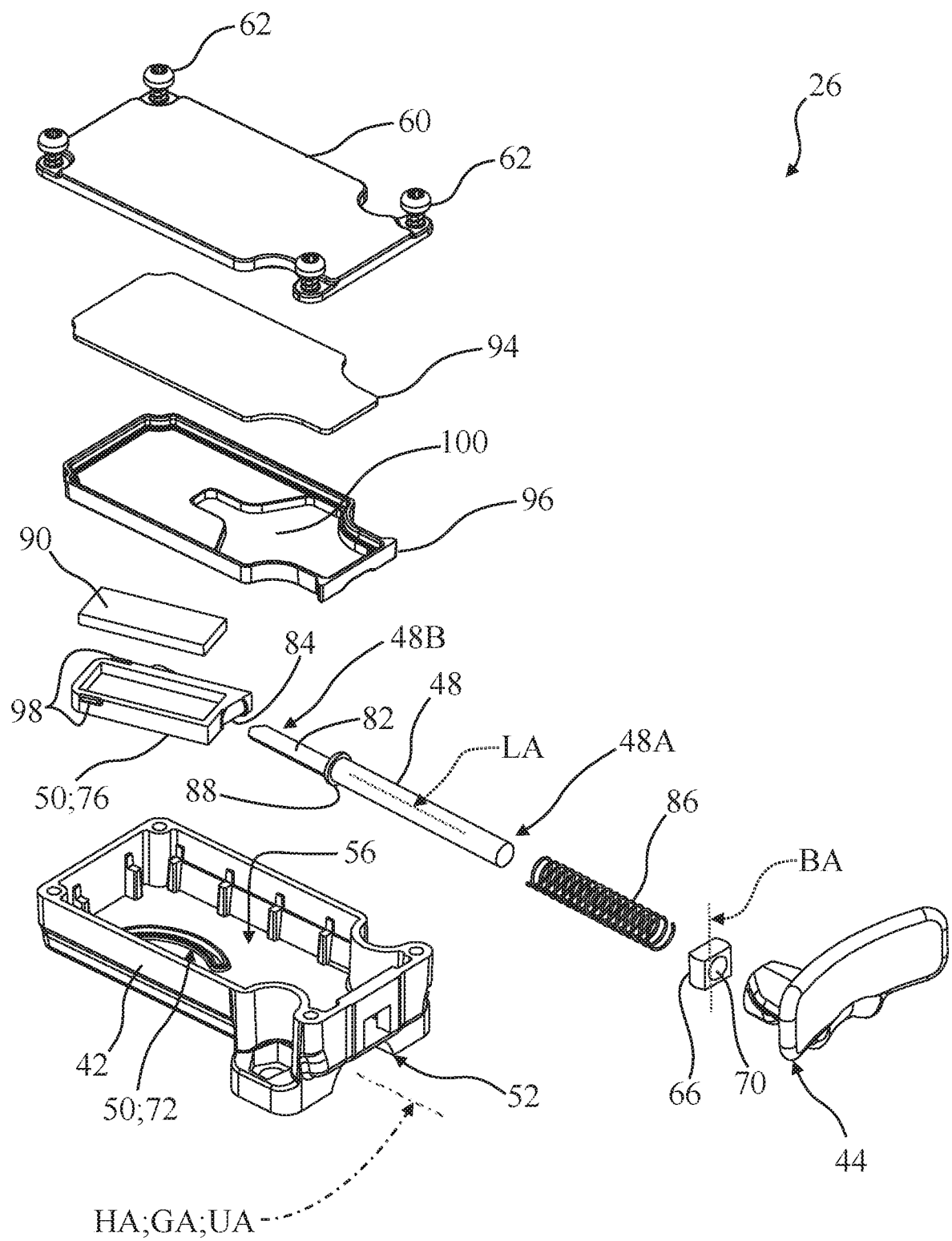
FIG. 6 is an exploded perspective view of the throttle assembly of FIGS. 2A-5, shown having a housing, a link, a thumb trigger, and a track mechanism according to embodiments of the present invention.
Figure 7:
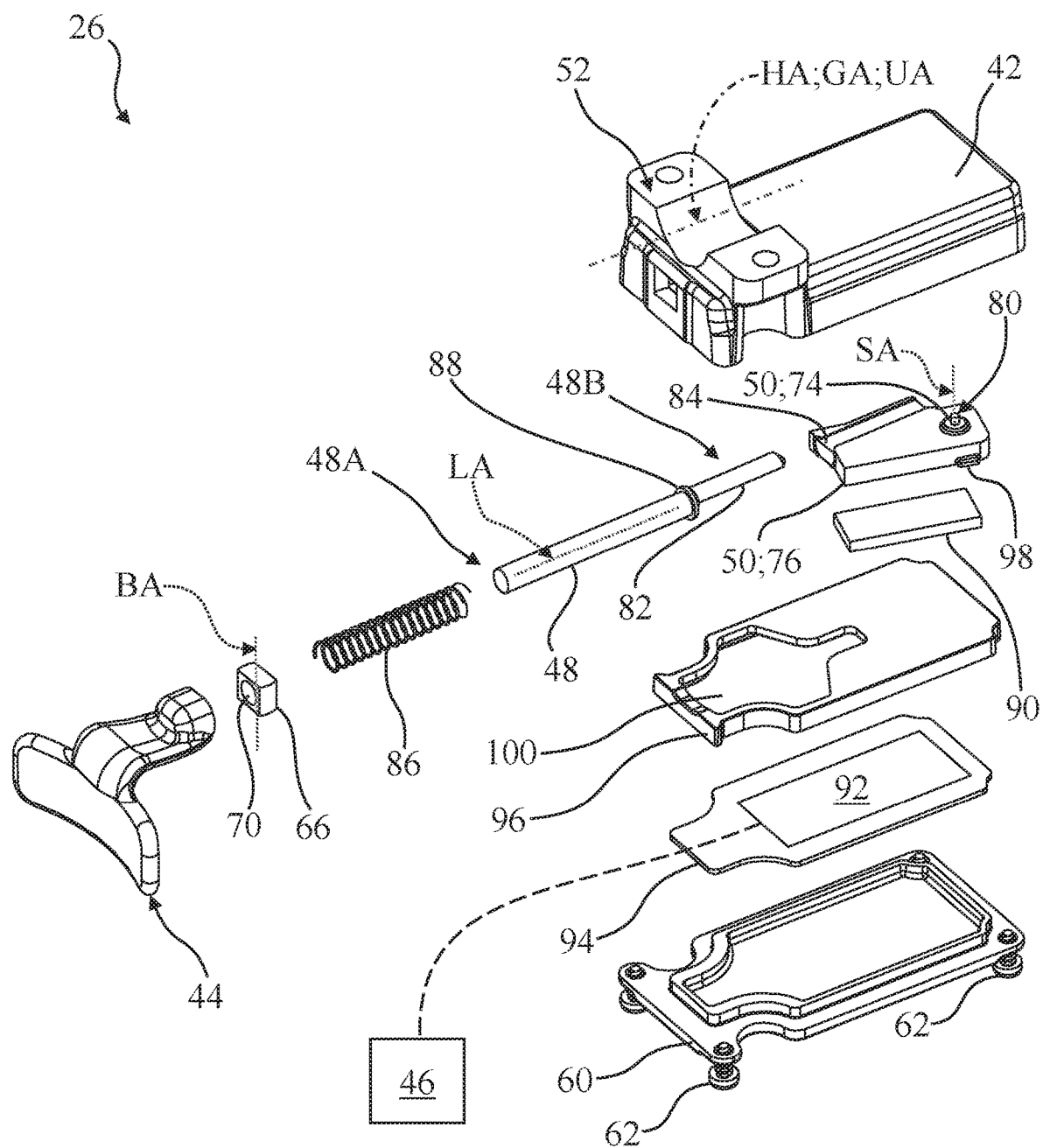
FIG. 7 is another perspective view of the throttle assembly of FIG. 6.

As is best depicted in FIGS. 6-7, in addition to the housing 42 and the thumb trigger 44, the throttle assembly 26 also includes a link, generally indicated at 48, and a track mechanism, generally indicated at 50. Each of these components will be described in greater detail below. The housing 42 has a mount 52 adapted to attach or otherwise secure to the handlebar 22 adjacent to the grip 36, and at least a portion of the housing 42 defines a housing axis UA which, in some embodiments, is adapted to be substantially parallel to the grip axis GA and/or the handlebar axis HA. In the representative embodiment illustrated herein, the housing axis UA is aligned with the handlebar axis HA and the grip axis GA, each of which are illustrated in FIGS. 9A-9E as a single, straight line. Here too, like the handlebar axis HA and the grip axis GA described above, the housing axis UA can be arranged or otherwise defined in a number of different ways to accommodate different types of vehicles 20, handlebars 22, and the like. Thus, while the housing axis UA is substantially parallel to the grip axis GA in the illustrated embodiment, it is conceivable that the housing axis UA could be substantially parallel to at least a portion of the handlebar 22, the grip 36, and the like.

Figure 11A:
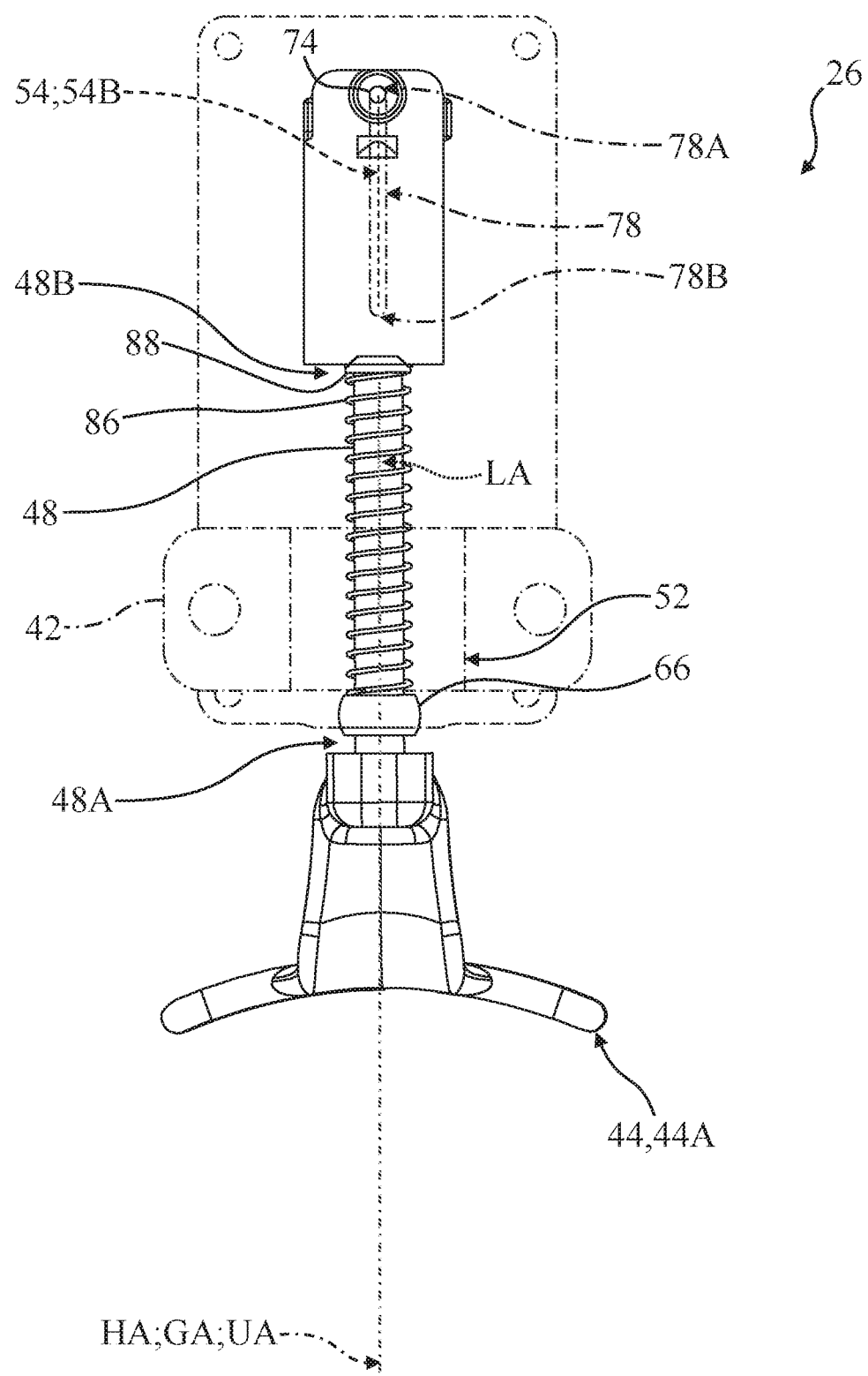
FIG. 11A is a bottom-side view of another embodiment of the throttle assembly of FIG. 9A, with the housing shown in phantom, and depicting the thumb trigger and the link arranged in the first trigger position.
Figure 11B:
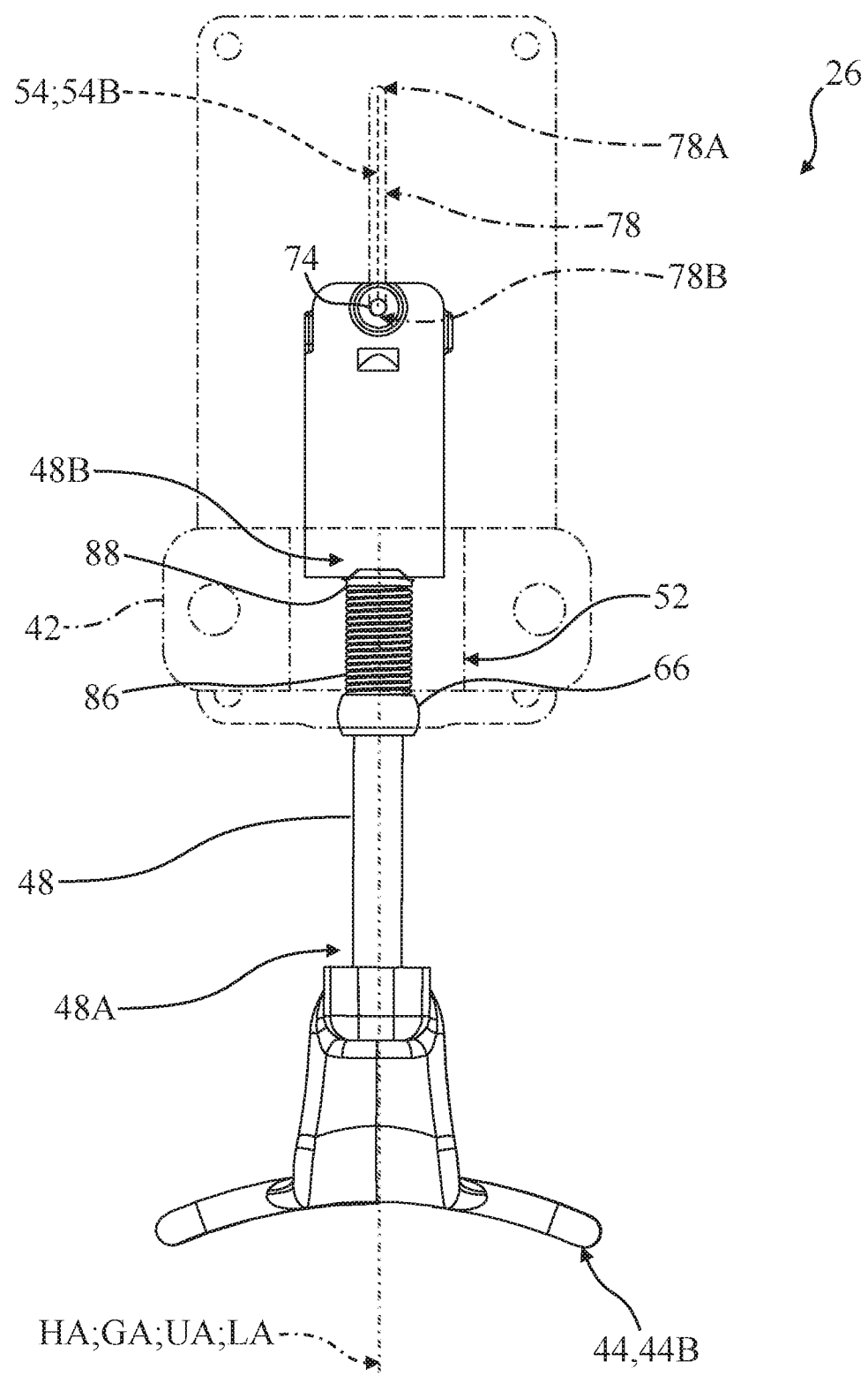
FIG. 11B is another bottom-side view of the throttle assembly of FIG. 11A, with the housing shown in phantom, and depicting the thumb trigger and the link arranged in the second trigger position.

The link 48 is slidably supported by the housing 42 and extends between a first link end 48A and a second link end 48B. The thumb trigger 44 is coupled to the first link end 48A such that the link 48 and the thumb trigger 44 concurrently move between the first and second trigger positions 44A, 44B. The track mechanism 50 is operatively attached to the housing 42 and to the second link end 48B of the link 48 to guide the link 48 along a path 54. In the embodiment illustrated in FIGS. 2A-9E, the track mechanism 50 guides the link 48 along a curvilinear path 54A. However, in other embodiments, the track mechanism 50 guides the link 48 along a linear path 54B, such as is depicted in embodiment illustrated in FIGS. 10A-10E and the embodiment illustrated in FIGS. 11A-11B.

With continued reference to FIGS. 2A-9E, in the illustrated embodiment, the track mechanism 50 guides the link 48 along the curvilinear path 54 such that movement of the thumb trigger 44 from the first trigger position 44A (see FIGS. 2A and 9A) to the second trigger position 44B (see FIGS. 2B and 9E) slides the thumb trigger 44 away from the housing 42 (sequentially compare FIGS. 9A-9E). Moreover, during at least a portion of the movement between the first and second trigger positions 44A, 44B, the thumb trigger 44 also traverses the housing axis UA. Put differently, in addition to sliding 44 away from the housing 42, the thumb trigger 44 also moves transverse to the housing axis UA. Thus, the curvilinear path 54A guides the thumb trigger 44 for movement between the first and second trigger positions 44A, 44B in two degrees of freedom: translation in the direction of the housing axis UA, and translation transverse to the housing axis UA. Here, it will be appreciated that the movement of the thumb trigger 44 is described with respect to the housing axis UA for the purposes of clarity and illustration. However, because the housing axis UA can be defined in different ways depending on the specific configuration of the housing 42, the handlebars 22, and the like, those having ordinary skill in the art will appreciate that movement of the thumb trigger 44 could similarly be defined differently, such as based on movement relative to a structural feature of the housing 42 itself.

As is best depicted in FIGS. 9A-9E, because the second end 48B of the link 48 is guided along the curvilinear path 54A by the track mechanism 50, the movement of the thumb trigger 44 between the first and second trigger positions 44A, 44B is also curved. Thus, as the rider of the vehicle 20 grasps the grip 36, the rider can articulate their thumb away from their index finger to engage against the thumb trigger 44 at the first trigger position 44A, and can subsequently articulate their thumb back toward their index finger to urge the thumb trigger 44 toward the second trigger position 44B. Here, the curved movement of the thumb trigger 44 effected by the guidance along the curvilinear path 54A advantageously follows the natural articulation of the thumb relative to the index finger. As will be appreciated from the subsequent description of the linear path 54B in connection with FIGS. 10A-10E, the specific shape, length, and orientation of the path 54 can be adjusted to effect correspondingly different movement of the thumb trigger 44, such as to accommodate different applications.

Figure 8:
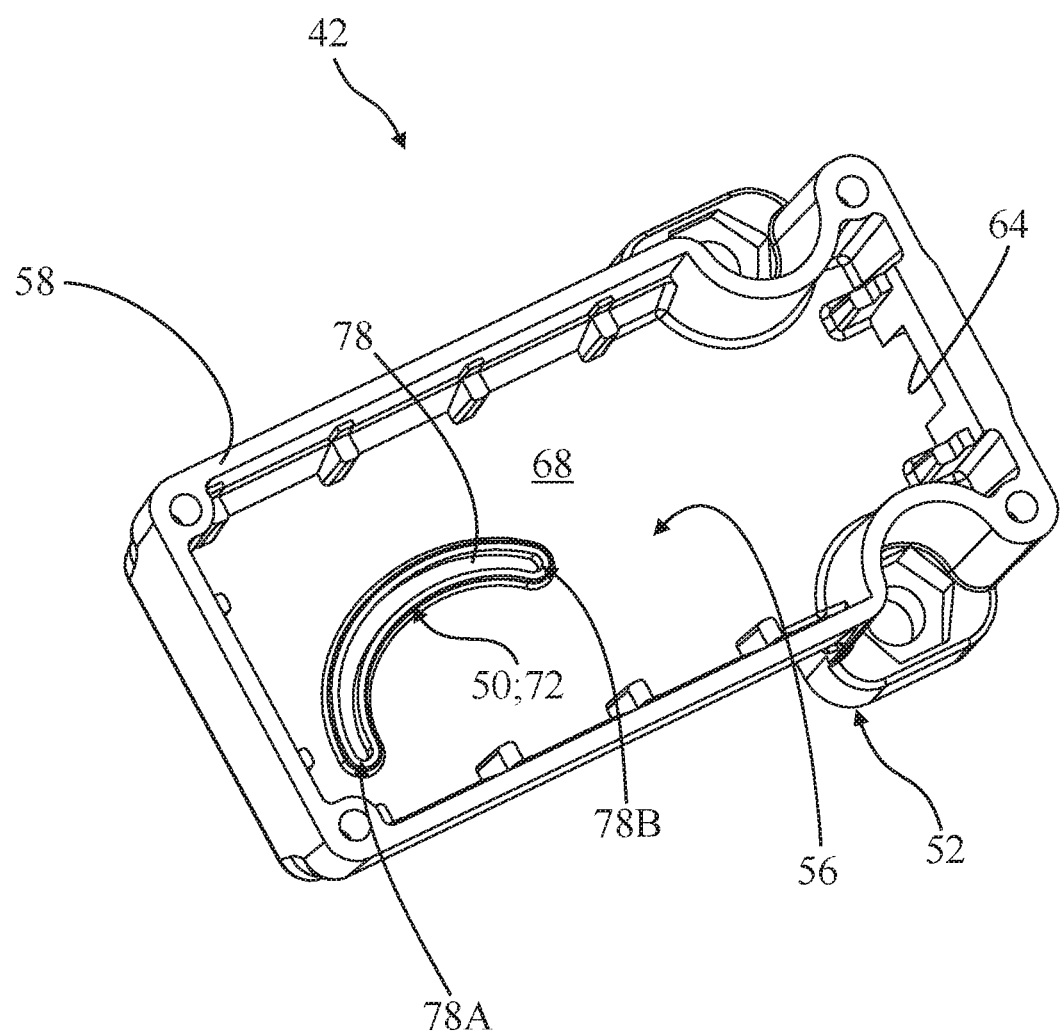
FIG. 8 is a perspective view depicting portions of the housing and the track mechanism of FIG. 6.

As is best depicted in FIGS. 6 and 8, the housing 42 defines an inner chamber 56 in which components of the throttle assembly 26, such as the track mechanism 50, are generally supported or otherwise accommodated. In the illustrated embodiment, and as is depicted in FIG. 8, the housing 42 has a shell-like configuration defining a flange 58 against which a cover 60 is secured via fasteners 62 (see FIGS. 6-7) to retain the components of the throttle assembly 26 and help prevent ingress of dirt, water, moisture, and other contaminants during use. Here, a gasket (not shown) may be interposed between the flange 58 of the housing 42 and the cover 60 to seal the inner chamber 56 of the housing 42 from exposure to the environment.

With continued reference to FIG. 8, the housing 42 is also provided with a bushing seat 64 which supports a bushing 66 to slidably support the link 48, and the inner chamber 56 of the housing 42 defines a lower surface 68 arranged generally parallel to the flange 58. While the specific configuration of the bushing seat 64, the bushing 66, and the lower surface 68 will each be described in greater detail below, those having ordinary skill in the art will appreciate that the housing 42 can be configured in a number of different ways sufficient to slidably support the link 48 and attach to the handlebar 22 via the mount 52, without departing from the scope of the present invention.

As noted above, the throttle assembly 26 employs the bushing 66 to slidably support the link 48 for movement relative to the housing 42 as the link 48 is guided by the track mechanism 50 during movement between the first and second trigger positions 44A, 44B. More specifically, the bushing 66 is coupled to the housing 42 and slidably supports the link 48 between the first link end 48A and the second link end 48B. Thus, as the thumb trigger 44 moves from the first trigger position 44A (see FIGS. 2A and 9A) to the second trigger position 44B (see FIGS. 2B and 9E), the first link end 48A of the link 48 translates away from the bushing 66 and the second link end 48B translates toward the bushing 66. As is described in greater detail below, the link 48 has a straight, generally cylindrical configuration extending along a link axis LA between the first link end 48A and the second link end 48B (see FIGS. 9A-9E). Thus, while the second link end 48B operatively attached to the track mechanism 50 is guided along the path 54 (for example, the curvilinear path 54A), the sliding movement or "translation" of the link 48 relative to the bushing 66 occurs linearly along the link axis LA. However, it will be appreciated that the link 48 could be configured differently, such as with a curved profile between the first and second link ends 48A, 48B.

In the representative embodiment illustrated herein, the bushing 66 is supported for rotation relative to the housing 42 such that movement of the thumb trigger 44 between the first and second trigger positions 44A, 44B effects translation of the link 48 relative to the bushing 66 and at least partially effects rotation of the bushing 66 relative to the housing 42 (compare FIGS. 9A-9E). To this end, the bushing 66 and the bushing seat 64 each have a rounded profile which allows the bushing 66 to rotate about a bushing axis BA which is arranged generally perpendicular to the link axis LA (bushing axis BA shown in FIGS. 6-7; rotation depicted in FIGS. 9A-9E). However, it will be appreciated that the bushing 66 can be configured to rotate relative to the housing 42 in a number of different ways without departing from the scope of the present invention. The bushing 66 defines a bushing aperture 70 which is shaped to slidably support the link 48 for translation relative to the housing 42. In the illustrated embodiment, the link 48 and the bushing aperture 70 each have a generally cylindrical profile, which helps effect the sliding movement of the link 48 described above. However, those having ordinary skill in the art will appreciate that the link 48 and the bushing aperture 70 could be provided with profiles of any suitable shape, configuration, or arrangement sufficient to effect sliding movement of the link 48.

As noted above, the track mechanism 50 is operatively attached to the second link end 48B of the link 48 and guides the link 48 along the path 54. To this end, the representative embodiment of the track mechanism 50 illustrated herein generally comprises a track member 72, a slider 74, and a carrier 76. As is best depicted in FIG. 8, the track member 72 is operatively attached to the housing 42 and defines a slot 78, which is engaged by the slider 74 and defines the path 54 as described in greater detail below. In the illustrated embodiment, the track member 72 is formed integrally with the housing 42 and extends into the inner chamber 56 from the lower surface 68 toward the flange 58. However, those having ordinary skill in the art will appreciate that the track member 72 and/or slot 78 could be formed or defined in a number of different ways sufficient to guide the link 48 along the path 54. By way of non-limiting example, the track member 72 could be formed as a discrete component which is subsequently secured, mounted, or otherwise attached to the housing 42.

The slider 74 is operatively attached to the second link end 48B of the link 48 and engages the slot 78 to guide the link 48 along the path 54 during movement of the thumb trigger 44 between the first and second trigger positions 44A, 44B, and also to restrict rotation of the link 48 about the link axis LA as the thumb trigger 44 moves between the first and second trigger positions 44A, 44B. Here, movement of the slider 74 along the slot 78 defines the path 54 along which the link 48 is guided. To this end, the slot 78 defines a first slot end 78A shaped to engage the slider 74 when the thumb trigger 44 is disposed in the first trigger position 44A (see FIGS. 9A and 10A), and a second slot end 78B shaped to engage the slider 74 when the thumb trigger 44 is disposed in the second trigger position 44B (see FIGS. 9E and 10E). The slider 74 has a generally cylindrical configuration (see FIG. 7), and the first and second slot ends 78A, 78B of the slot 78 are similarly curved to engage the slider 74. In the illustrated embodiments, the shape of the slot 78 between the first and second slot ends 78A, 78B defines the path 54; the slot 78 can be provided with a curved profile to define the curvilinear path 54A (see FIGS. 9A-9E) or, in some embodiments, a straight profile to define the linear path 54B (see FIGS. 10A-10E; see also FIGS. 11A-11B). Here, it will be appreciated that the rotation limiting functionality afforded by the engagement of the slider 74 within the slot 78 can be utilized in connection with any suitably shaped path 54. Moreover, while movement of the thumb trigger 44 is advantageously curved to follow the natural articulation of the rider's thumb as described above, it is conceivable that the rotation limiting functionality afforded by the engagement of the slider 74 within the slot 78 could also be utilized in applications where the thumb trigger 44 moves generally linearly. By way of non-limiting example, the trigger 44 of the embodiment illustrated in FIGS. 11A-11B moves generally linearly between the first and second trigger positions 44A, 44B. Other configurations are contemplated.

Figure 9A:
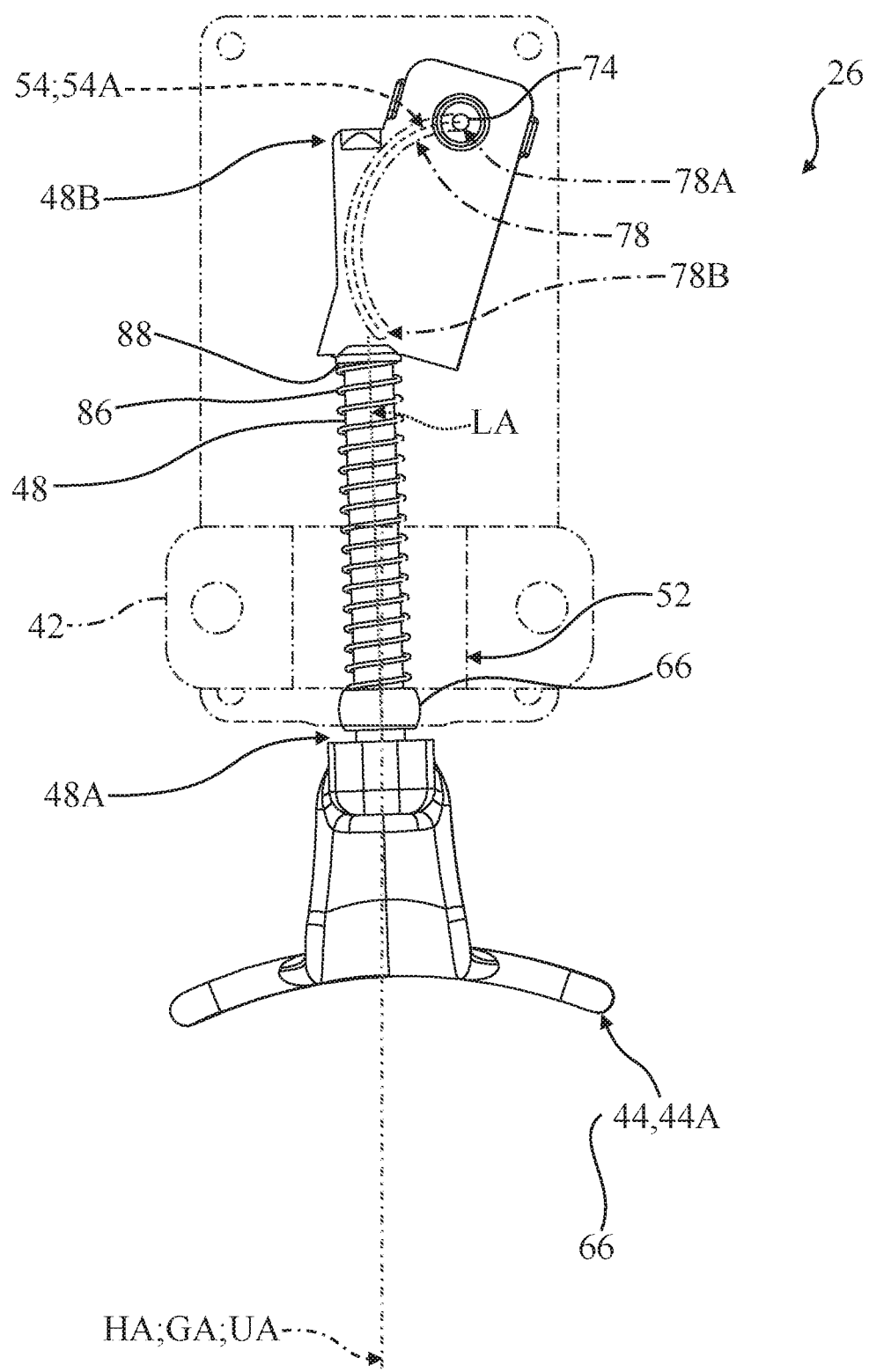
FIG. 9A is a bottom-side view of the throttle assembly of FIGS. 2A-7, with the housing shown in phantom, and depicting the thumb trigger and the link arranged in the first trigger position.
Figure 9B:
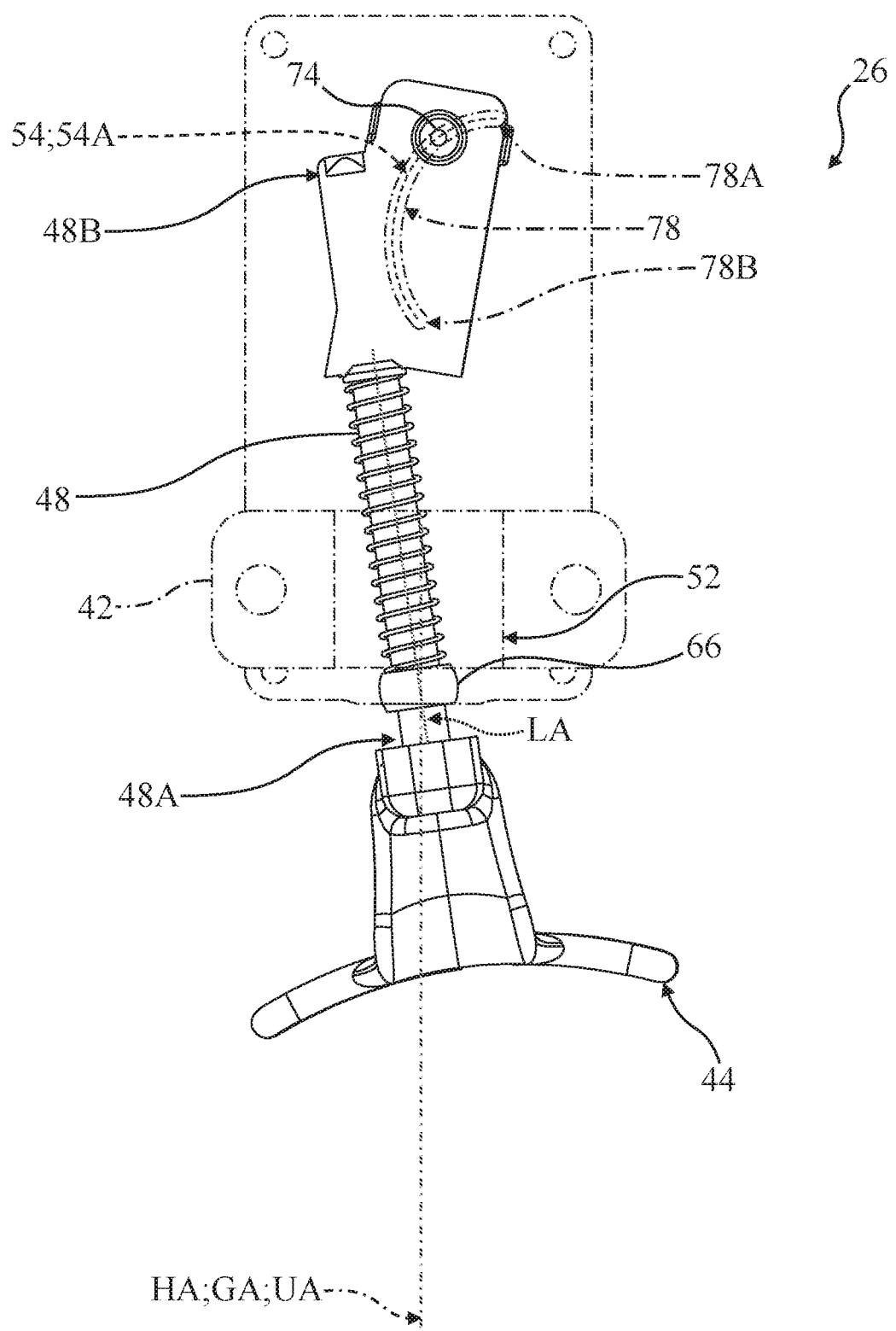
FIG. 9B is another bottom-side view of the throttle assembly of FIG. 9A, with the housing shown in phantom, and depicting the thumb trigger and the link moved away from the first trigger position and toward the second trigger position guided along a curvilinear path by the track mechanism.
Figure 9C:
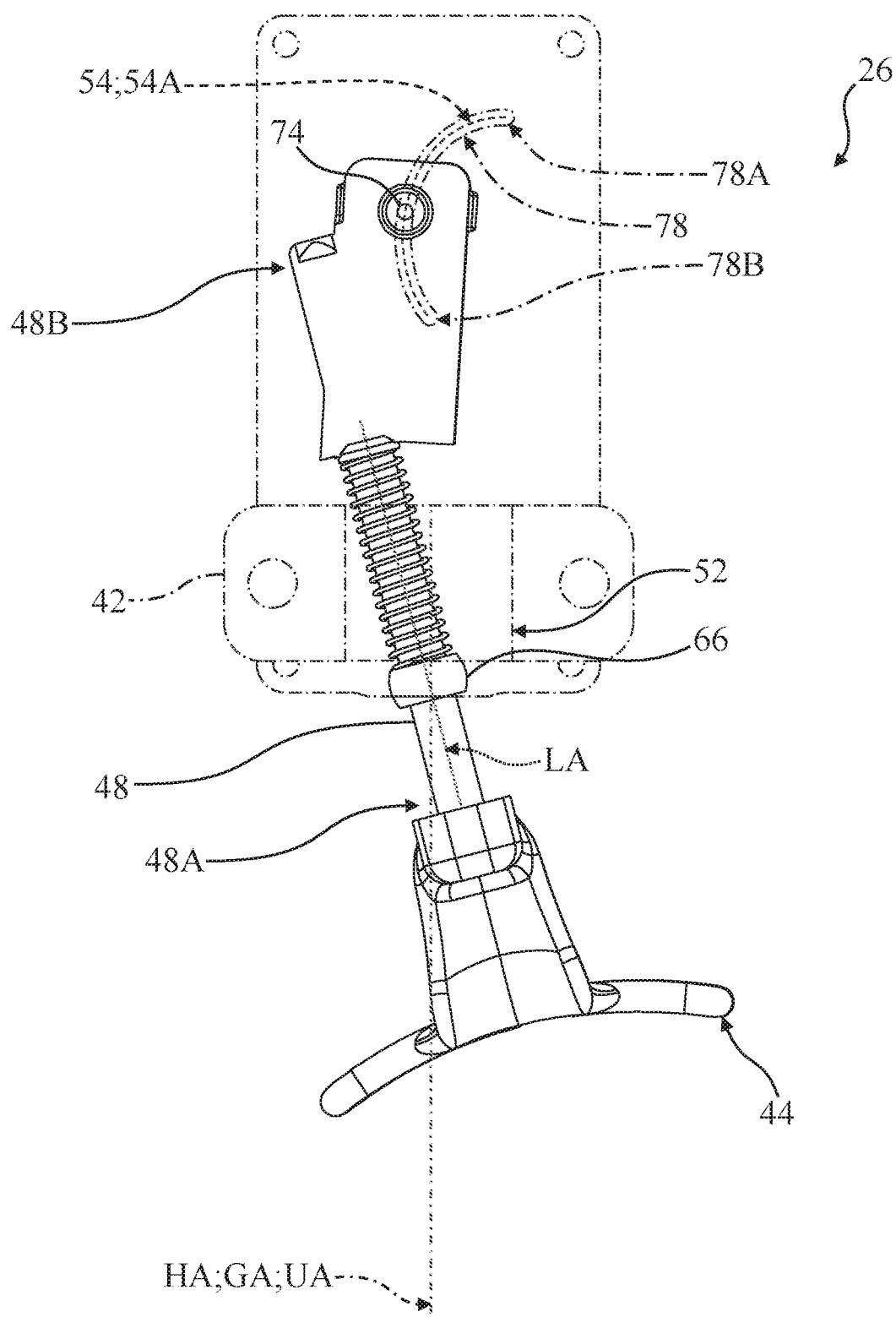
FIG. 9C is another bottom-side view of the throttle assembly of FIG. 9B, with the housing shown in phantom, and depicting the thumb trigger and the link moved further away from the first trigger position and toward the second trigger position guided along the curvilinear path by the track mechanism.
Figure 9D:
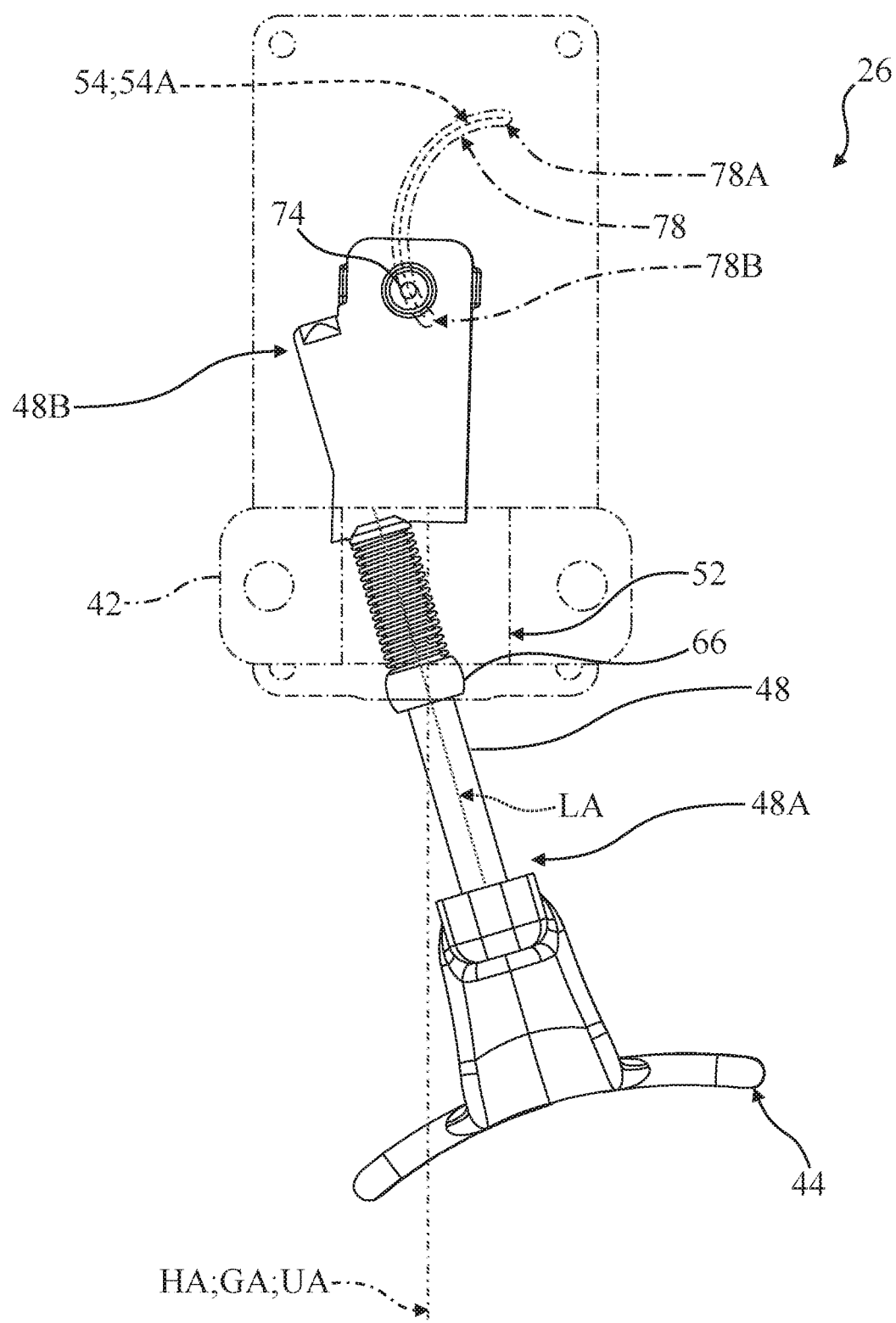
FIG. 9D is another bottom-side view of the throttle assembly of FIG. 9C, with the housing shown in phantom, and depicting the thumb trigger and the link moved even further away from the first trigger position and toward the second trigger position guided along the curvilinear path by the track mechanism.
Figure 9E:
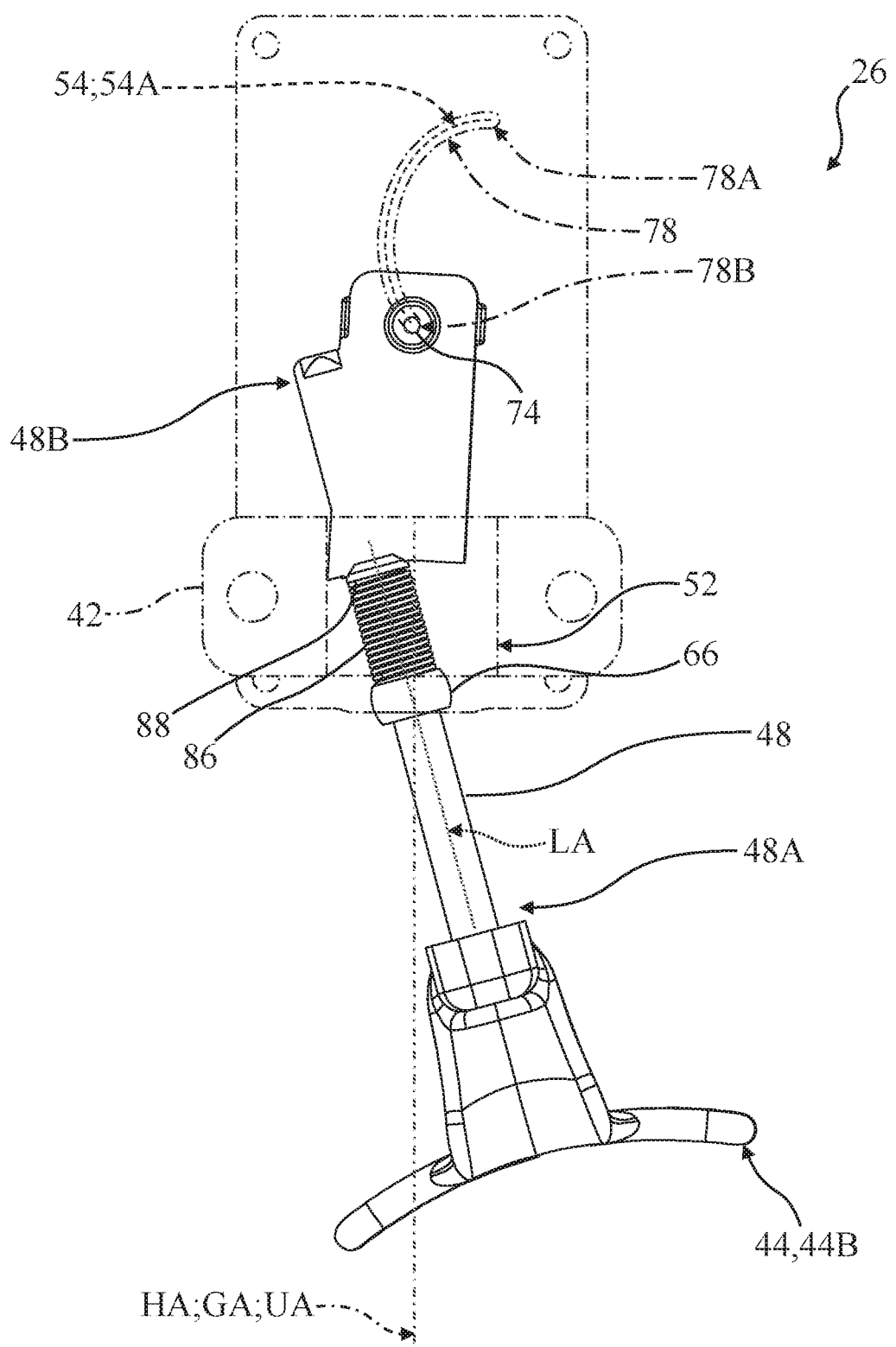
FIG. 9E is another bottom-side view of the throttle assembly of FIG. 9D, with the housing shown in phantom, and depicting the thumb trigger and the link arranged in the second trigger position.
Figure 10A:
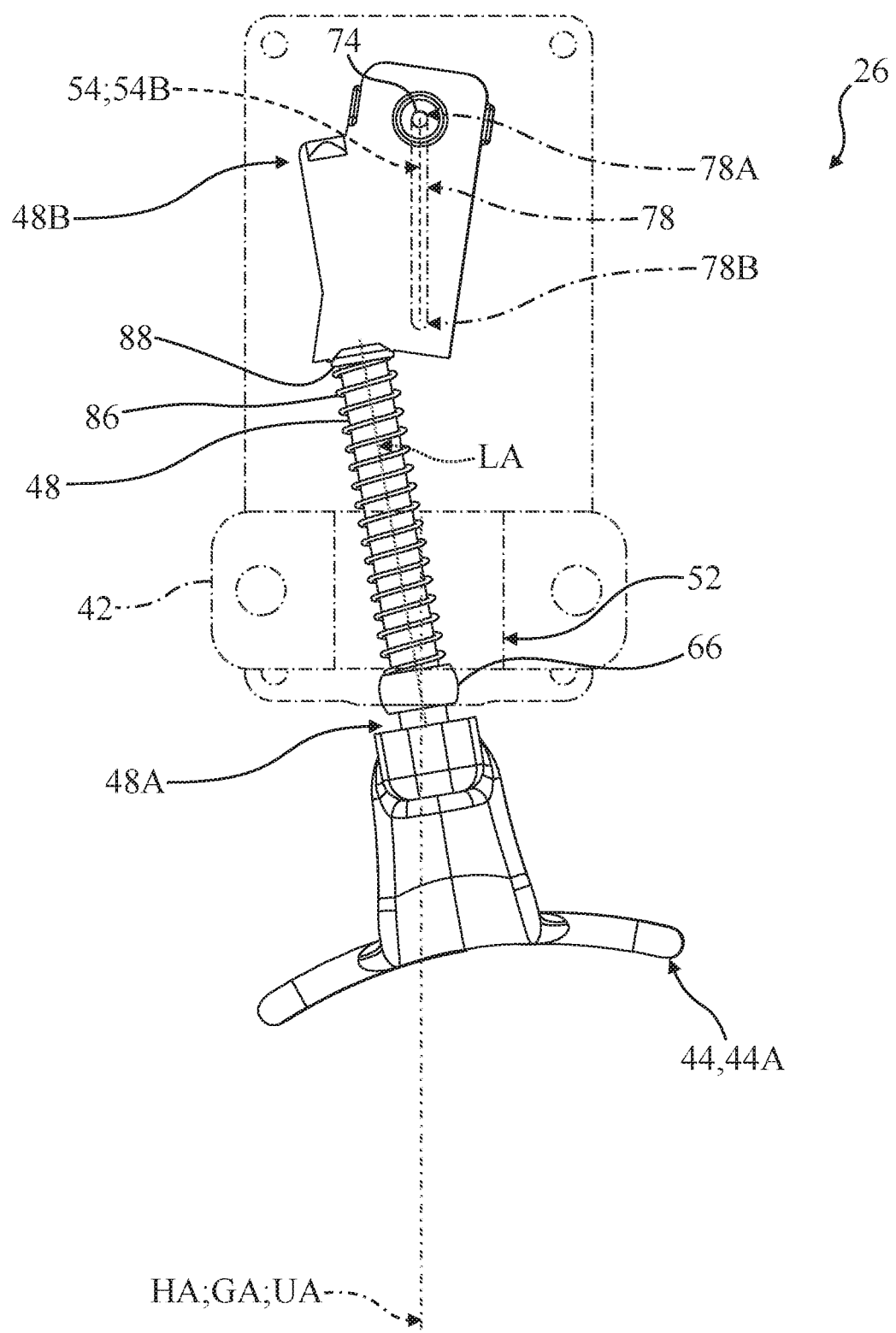
FIG. 10A is a bottom-side view of another embodiment of the throttle assembly of FIG. 9A, with the housing shown in phantom, and depicting the thumb trigger and the link arranged in the first trigger position.
Figure 10B:
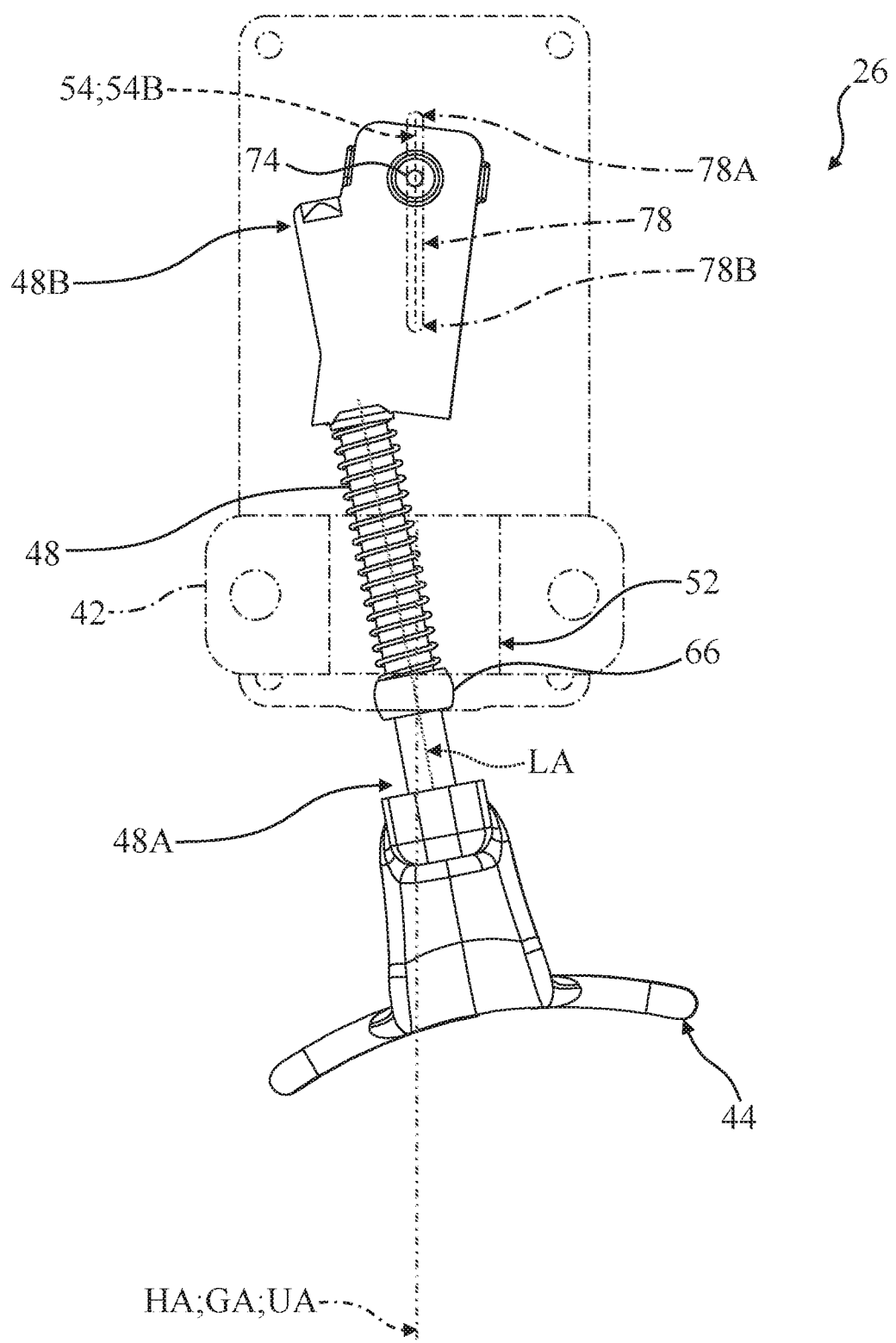
FIG. 10B is another bottom-side view of the throttle assembly of FIG. 10A, with the housing shown in phantom, and depicting the thumb trigger and the link moved away from the first trigger position and toward the second trigger position guided along a linear path by the track mechanism.
Figure 10C:
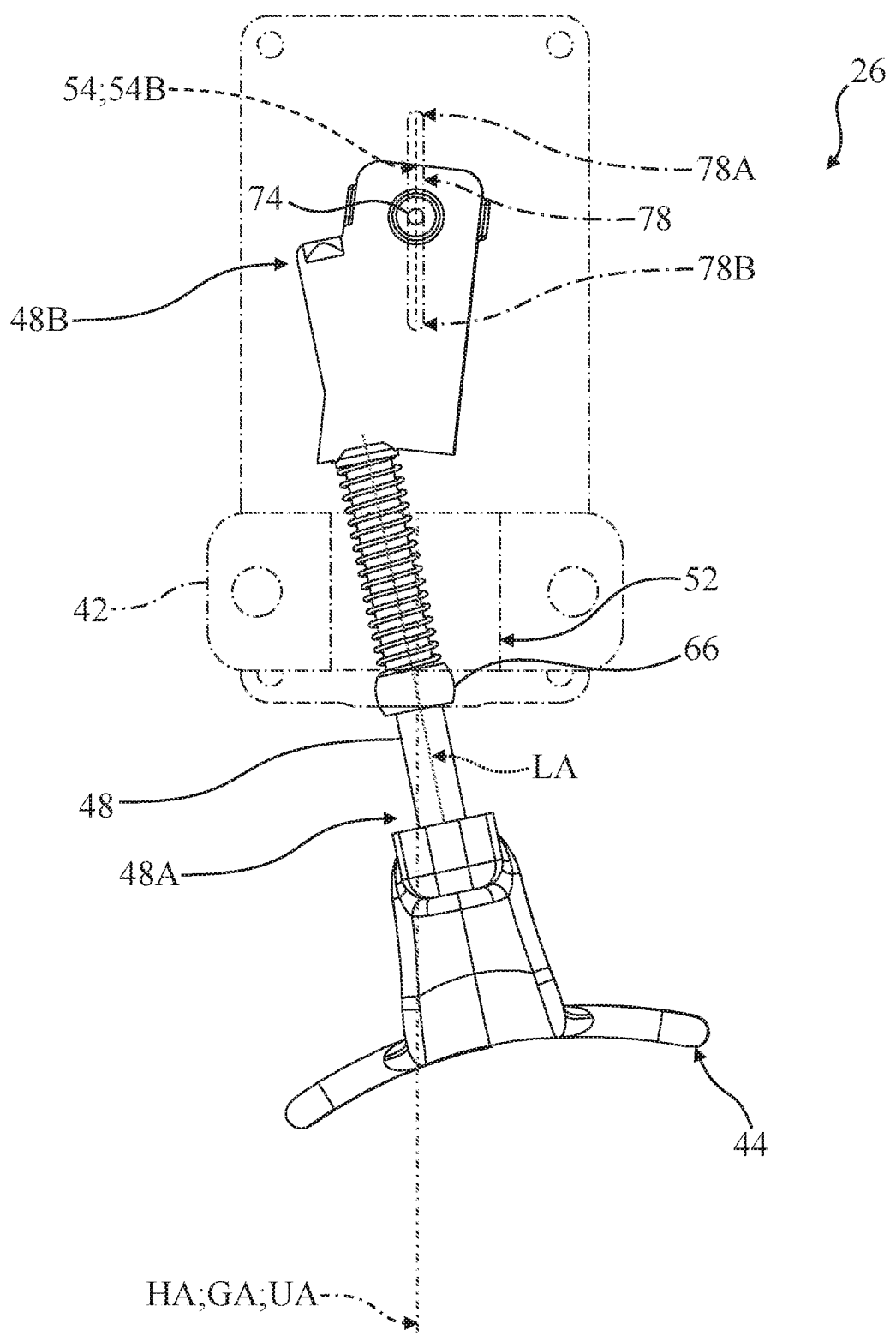
FIG. 10C is another bottom-side view of the throttle assembly of FIG. 10B, with the housing shown in phantom, and depicting the thumb trigger and the link moved further away from the first trigger position and toward the second trigger position guided along the linear path by the track mechanism.
Figure 10D:
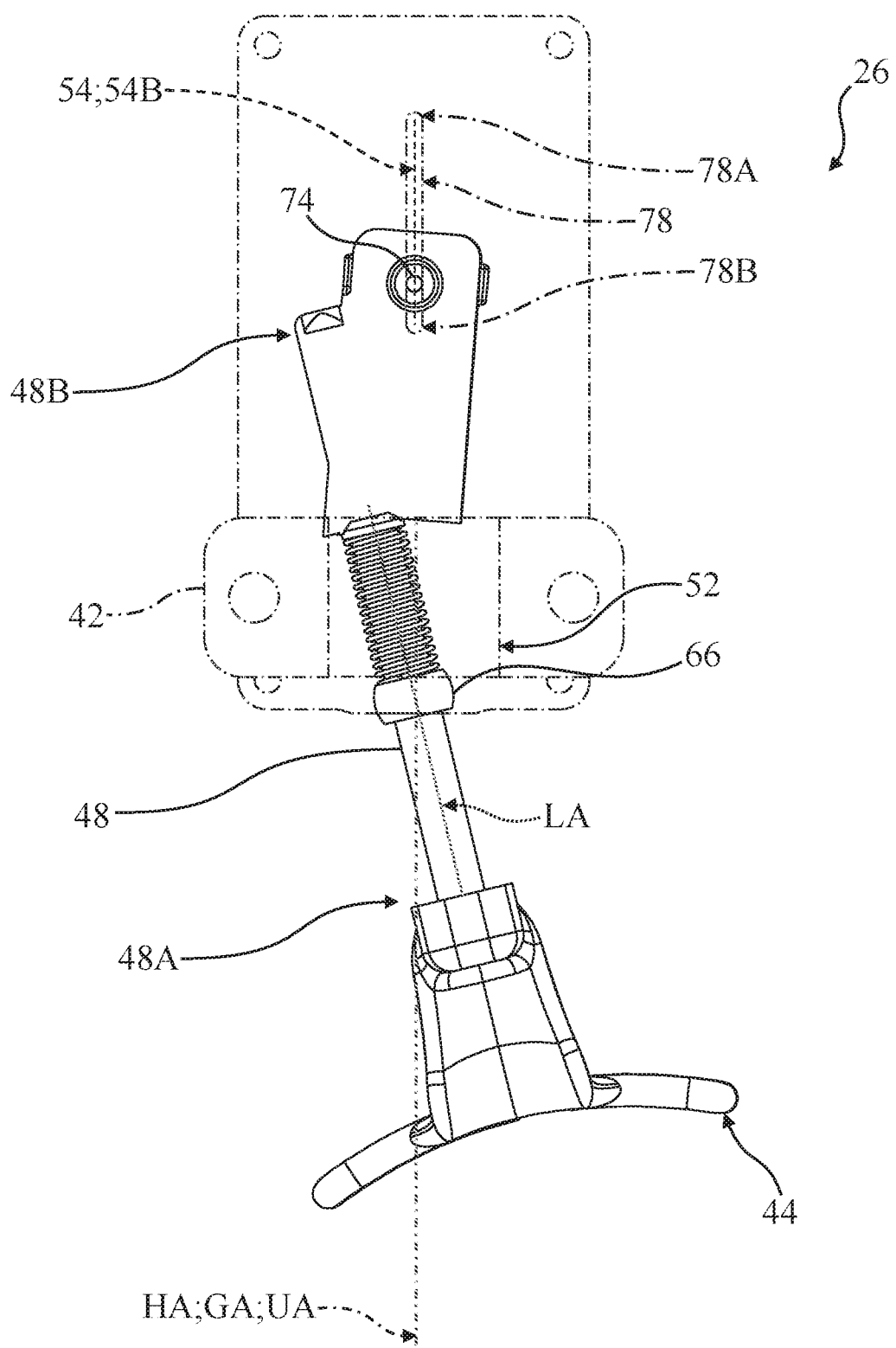
FIG. 10D is another bottom-side view of the throttle assembly of FIG. 10C, with the housing shown in phantom, and depicting the thumb trigger and the link moved even further away from the first trigger position and toward the second trigger position guided along the linear path by the track mechanism.
Figure 10E:
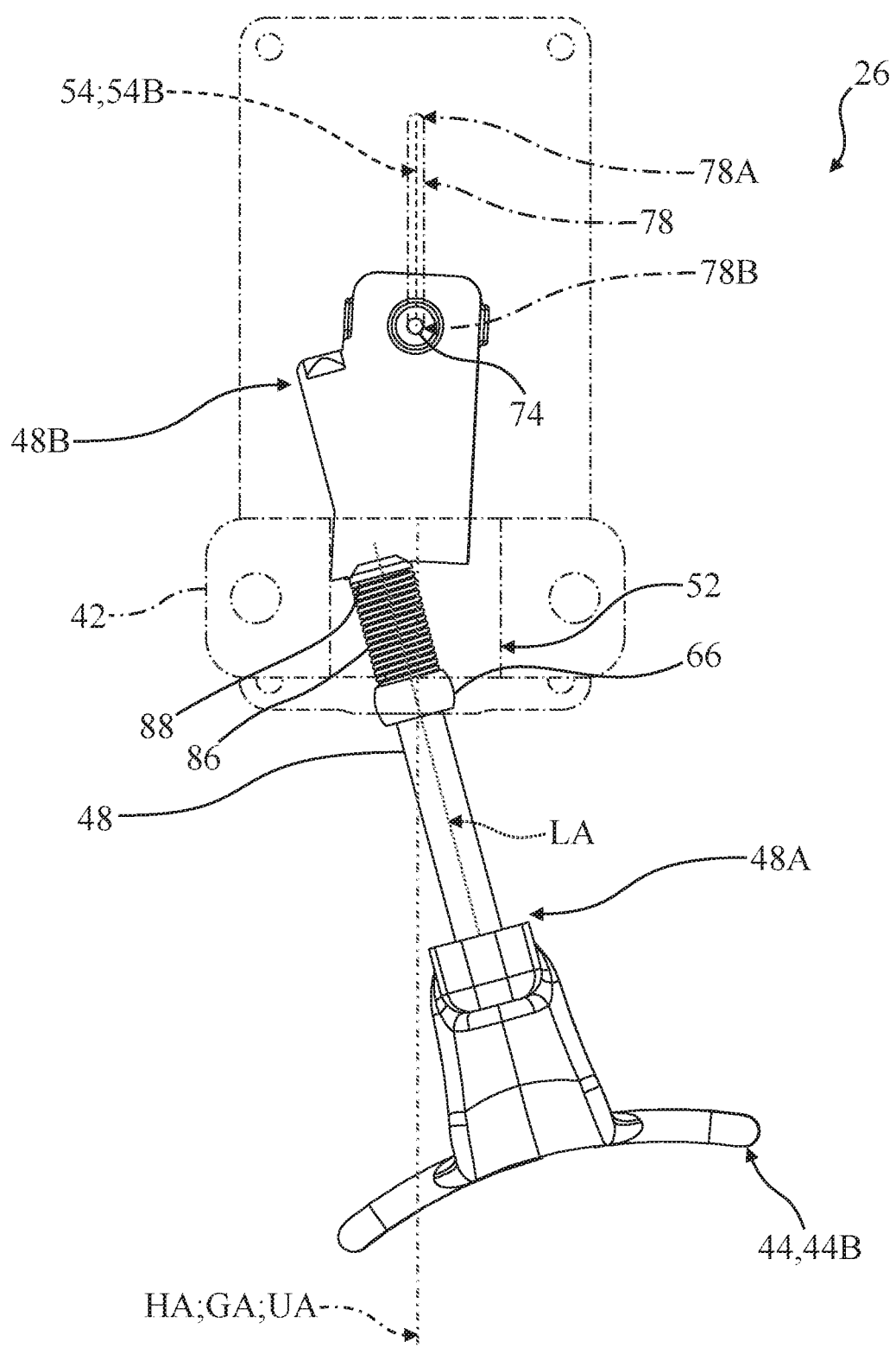
FIG. 10E is another bottom-side view of the throttle assembly of FIG. 10D, with the housing shown in phantom, and depicting the thumb trigger and the link arranged in the second trigger position.
Figure 12:
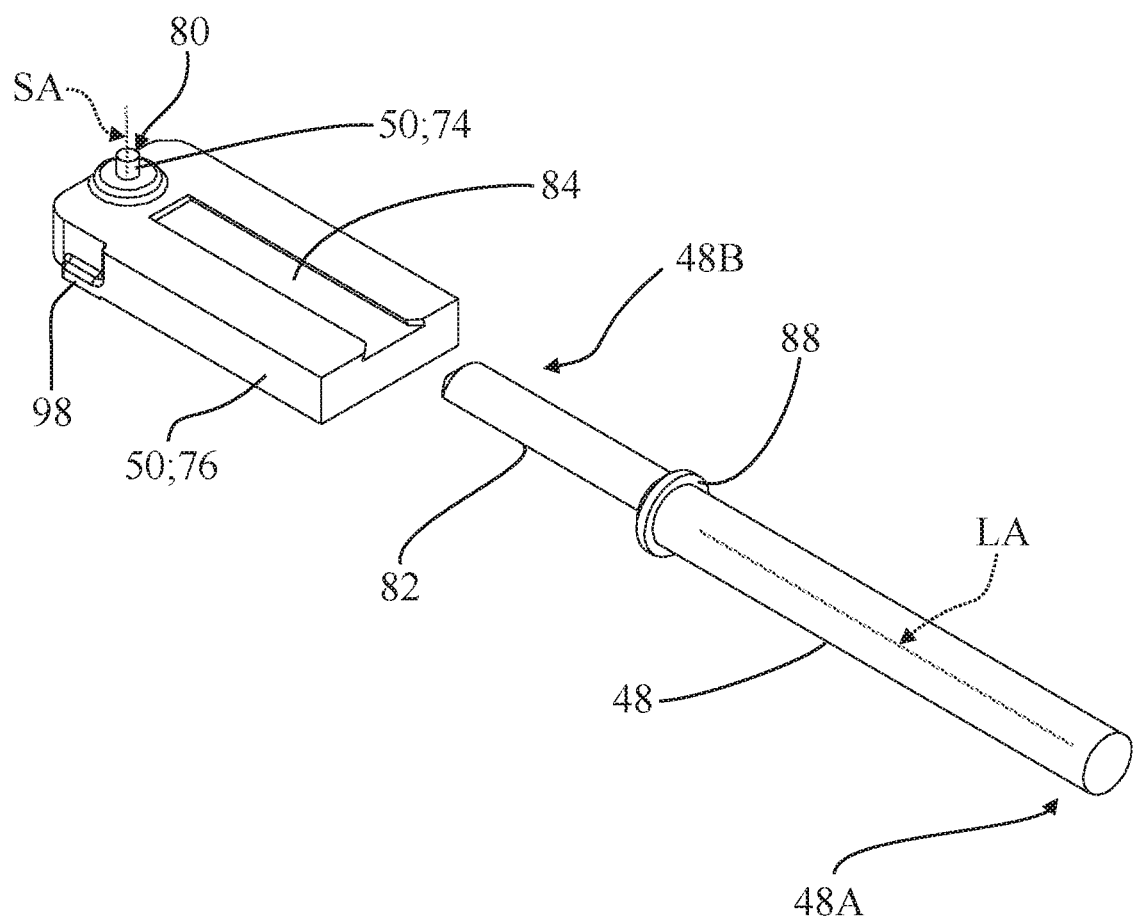
FIG. 12 is an exploded perspective view depicting the link and a carrier of the throttle assembly of FIGS. 11A-11B.
Figure 13:
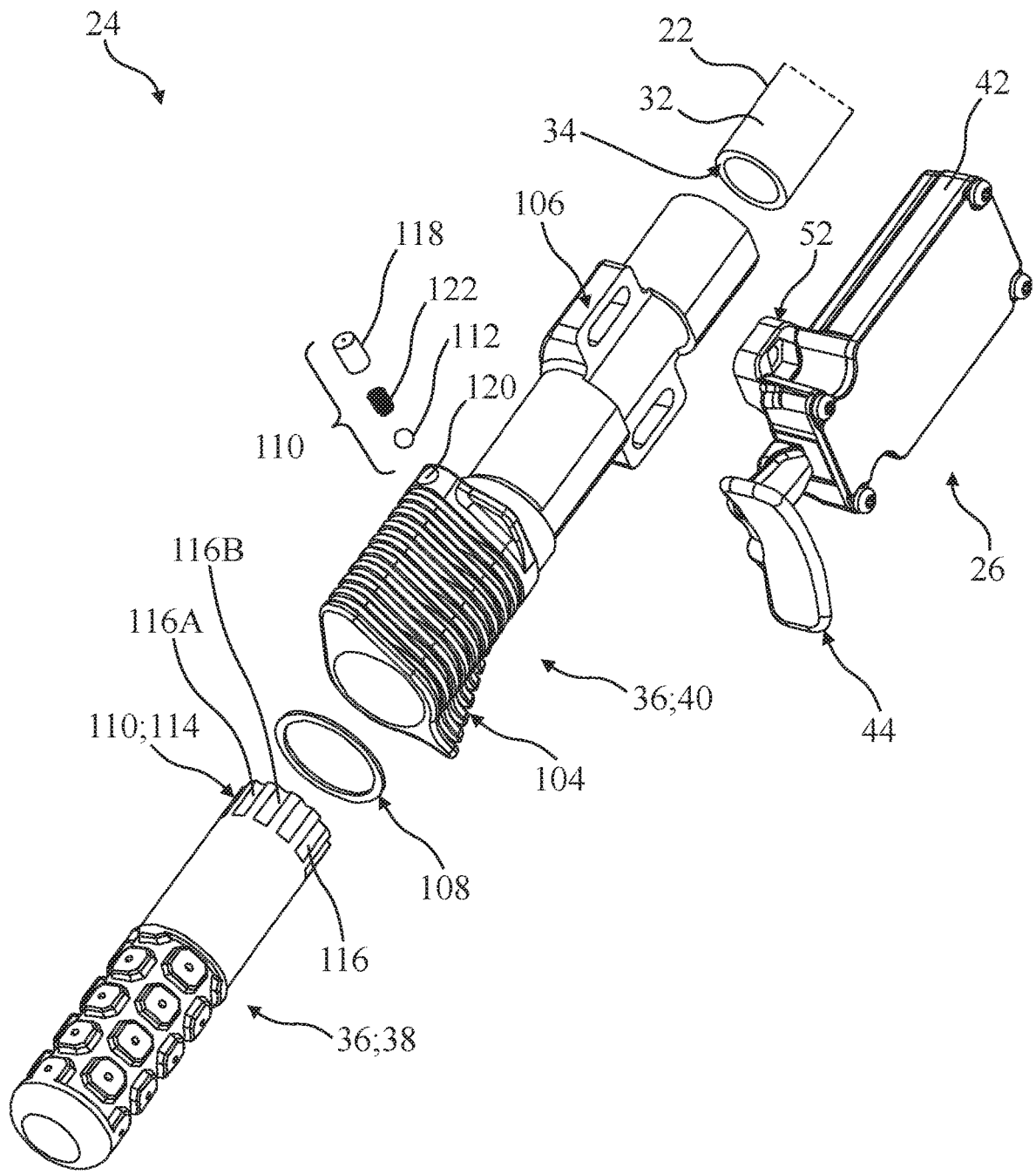
FIG. 13 is an exploded partial perspective view of another embodiment of the control system of FIGS. 1-4, shown having a detent mechanism adapted to restrict rotation between the first grip element and the second grip element.

In the illustrated embodiment, the slider 74 is formed integrally with the carrier 76 and is arranged generally perpendicular to and spaced laterally from the link axis LA (see also FIG. 9A). Put differently, as illustrated in FIG. 7, the slider 74 extends from the carrier 76 along a slider axis SA to a slider end 80, with the slider axis SA arranged perpendicular to but not intersecting the link axis LA. This arrangement of the carrier 76 and the slider 74 affords mechanical advantage between the track member 72 and the link 48 which helps promote reduced component packaging size. However, other arrangements and configurations are contemplated. By way of non-limiting example, in the embodiment illustrated in FIGS. 11A-12, the link 48, the carrier 76, and the slider 74 are configured such that the slider axis SA is arranged perpendicular to the link axis LA and also intersects the link axis LA (slider axis SA depicted in FIG. 12). It will be appreciated that this configuration could be implemented in connection with different types of slots 78, such as those illustrated in the embodiment illustrated in FIGS. 9A-9E and/or the embodiment illustrated in FIGS. 10A-10E. While the slider 74 is formed integrally with the carrier 76 in the illustrated embodiments, it will be appreciated that the slider 74 could be coupled to the carrier 76 in any suitable way sufficient to result in movement of the slider 74 within the slot 78 guiding the carrier 76 and the second link end 48B of the link 48 along the path 54.

In order to help facilitate assembly of the throttle assembly 26, the link 48 and the carrier 76 are formed as separate components which are shaped to engage each other and move concurrently in operation to effect movement of the thumb trigger 44 between the first and second trigger positions 44A, 44B. To this end, and as is best depicted in FIG. 6, the link 48 is provided with a notched region 82 adjacent the second link end 48B, and the carrier 76 is provided with a corresponding slotted region 84 shaped to receive the notched region 82. The notched region 82 and the slotted region 84 are shaped to inhibit or otherwise prevent relative movement between the link 48 and the carrier 76 in operation.

As is best depicted in FIGS. 6, 7, and 9A-9E, the throttle assembly 26 includes a biasing element 86 arranged between the housing 42 and the second link end 48B of the link 48 to bias the thumb trigger 44 toward the first trigger position 44A (see FIG. 9A). To this end, the link 48 is provided with a perch 88 (see FIGS. 6-7) formed adjacent to the second link end 48B, and the biasing element 86 is realized as a cylindrical compression spring which extends between the perch 88 and the bushing 66. As the thumb trigger 44 moves from the first trigger position 44A (see FIG. 9A) to the second trigger position 44B (see FIG. 9E), the biasing element is compressed as the perch 88 of the link 48 moves toward the bushing 66. Here, stored potential energy in the compressed biasing element 86 urges the thumb trigger 44 away from the second trigger position 44B. Those having ordinary skill in the art will appreciate that the biasing element 86 could be configured and/or arranged in a number of different ways sufficient to bias the thumb trigger 44 toward the first trigger position 44A.

As noted above, the throttle assembly 26 is configured to communicate the relative position of the thumb trigger 44 between the first and second trigger positions 44A, 44B to the controller 46 which, in turn, can adjust the operation of the engine 28 in response. To this end, in the representative embodiment illustrated herein, the throttle assembly 26 comprises an emitter 90 operatively attached to the carrier 76 for concurrent movement, and a detector 92 operatively attached to the housing 42 for determining a position of the emitter 90 as the thumb trigger 44 moves between the first and second trigger positions 44A, 44B (see FIG. 7). In one embodiment, the emitter 90 is further defined as a magnet, and the detector 92 is responsive to predetermined changes in magnetic fields generated by the magnet to determine the relative position of the emitter 90. To that end, the detector 92 may be of any suitable type sufficient to sense and respond to changes in magnetic fields. Moreover, it is conceivable that the emitter 90 could be manufactured from an iron-based material and the detector 92 could be a hall-effect sensor that generates a magnetic field and is capable of responding to changes in the field due to interaction of the iron-based material of the emitter 90. To that end, the emitter 90 may also be realized as a ferrous enamel, coating, paint, or the like. In one embodiment, one or more detectors 92 are disposed in electrical communication with the controller 46 such that operation of the engine 28 can be adjusted or changed via the controller 46 based at least partially on positional changes of the thumb trigger 44 between the first and second trigger positions 44A, 44B.

As is best depicted schematically in FIG. 7, the detector 92 is supported on a printed circuit board 94 which is disposed within the inner chamber 66 of the housing 42 and is arranged between a plate 96 and the cover 60. The plate 96 helps keep the various components of the track mechanism 50 retained and aligned during operation by limiting movement in the direction of the slider axis SA such that the carrier 76 can "slide" along the plate 96 as the thumb trigger 44 moves between the first and second trigger positions 44A, 44B. In one embodiment, the carrier 76 is provided with feet 98 which help promote sliding along the plate 96. In the illustrated embodiment, the plate 96 defines a clearance aperture, generally indicated at 100, which is shaped and arranged to ensure proper movement of the link 48 within the inner chamber 56 of the housing 56. It will be appreciated that the clearance aperture 100, the feet 98, the plate 96, and/or the housing 42 could each be shaped to restrict, limit, guide, retain, or otherwise control movement of the link 48 and/or the carrier 76.

Referring now to FIGS. 2A-16C, as noted above, the control system 24 is configured to facilitate concurrent rotation of the second grip element 40 and the throttle assembly 26 about the grip axis GA (or, the handlebar axis HA) relative to the first grip element 38 between the first riding position 40A (see FIGS. 2A-2B and 14A-14B) and the second riding position 40B (see FIGS. 2C-2D and 14C-14D). Here, the housing 42 of the throttle assembly 26 is operatively attached to the second grip element 40 to concurrently rotate between the first and second riding positions 40A, 40B, and the trigger 44 of the throttle assembly 26 is movable relative to the housing 42 between the first trigger position 44A (see FIGS. 2A, 2C, 14A, and 14C) and the second trigger position 44B (see FIGS. 2B, 2D, 14B, and 14D) independent of rotation between the first riding position 40A (see FIGS. 2A-2B and 14A-14B) and the second riding position 40B (see FIGS. 2C-2D and 14C-14D). This configuration allows the rider of the vehicle 20 to change positions (for example, between sitting and standing) while operating the vehicle 20 without having to adjust their hand position relative to the throttle assembly 26. Thus, the control system 24 allows the rider to maintain consistent engagement with the throttle assembly 26 irrespective of their riding position. Moreover, the control system 24 allows the rider to transition between riding positions while maintaining consistent engagement of the throttle assembly 26 during the transition. As will be appreciated from the subsequent description below, the advantages afforded by the control system 24 can also be implemented in connection with other types of throttle assemblies in addition to the throttle assemblies 26 described herein.

Figure 3:
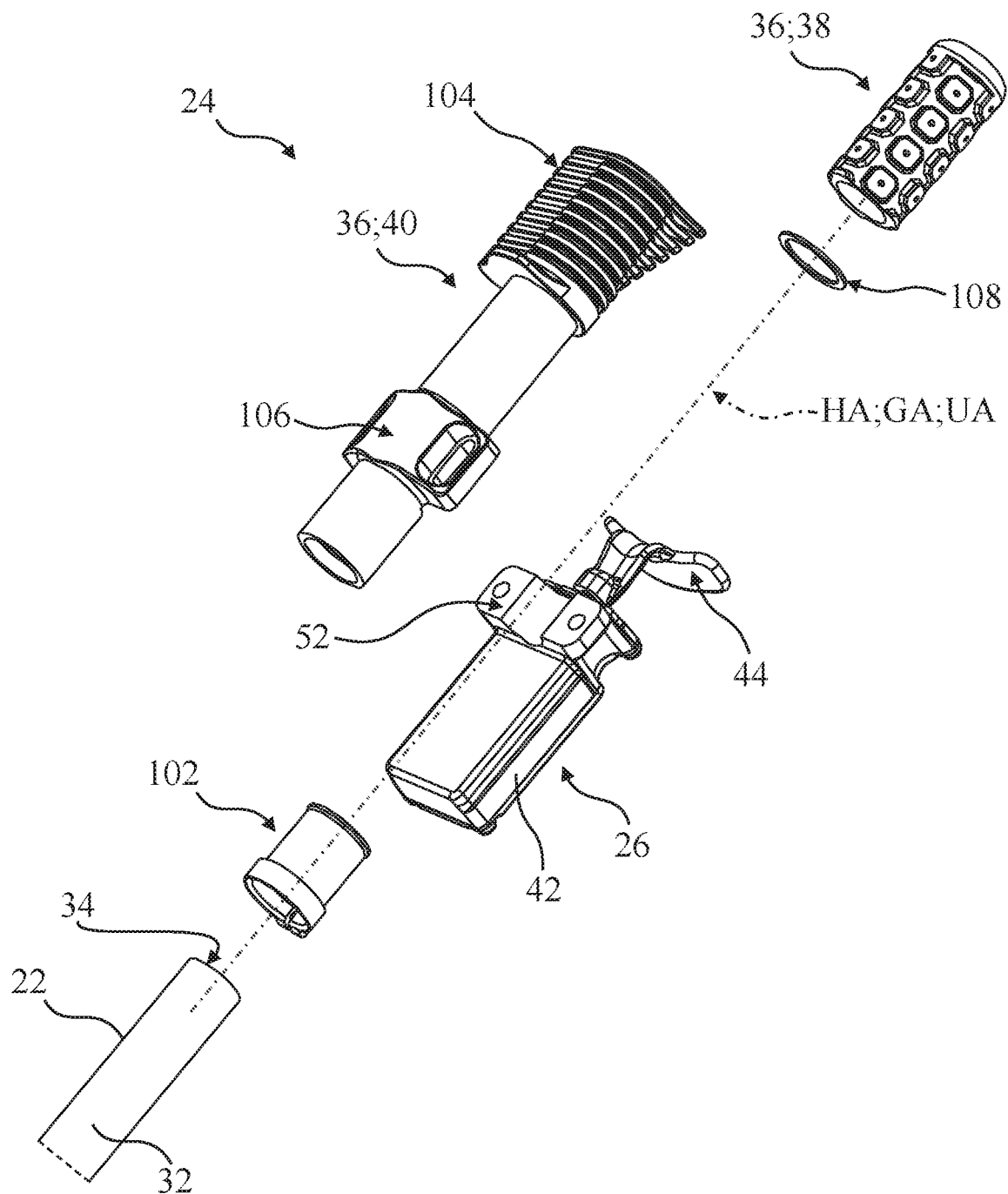
FIG. 3 is an exploded partial perspective view of the handlebars, the control system, and the throttle assembly of FIGS. 2A-2D.
Figure 4:
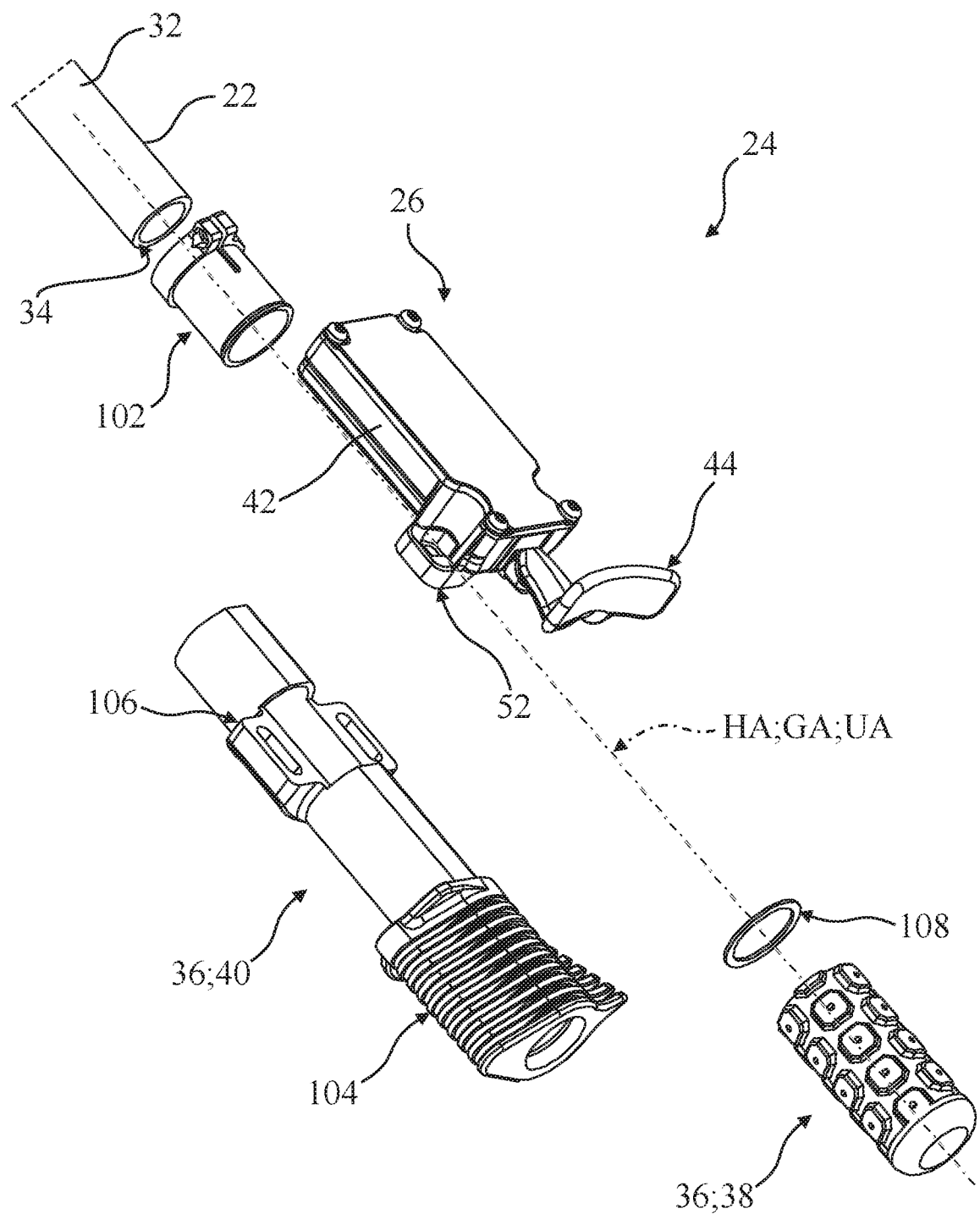
FIG. 4 is another exploded partial perspective view of the handlebars, the control system, and the throttle assembly of FIG. 3.
Figure 5:
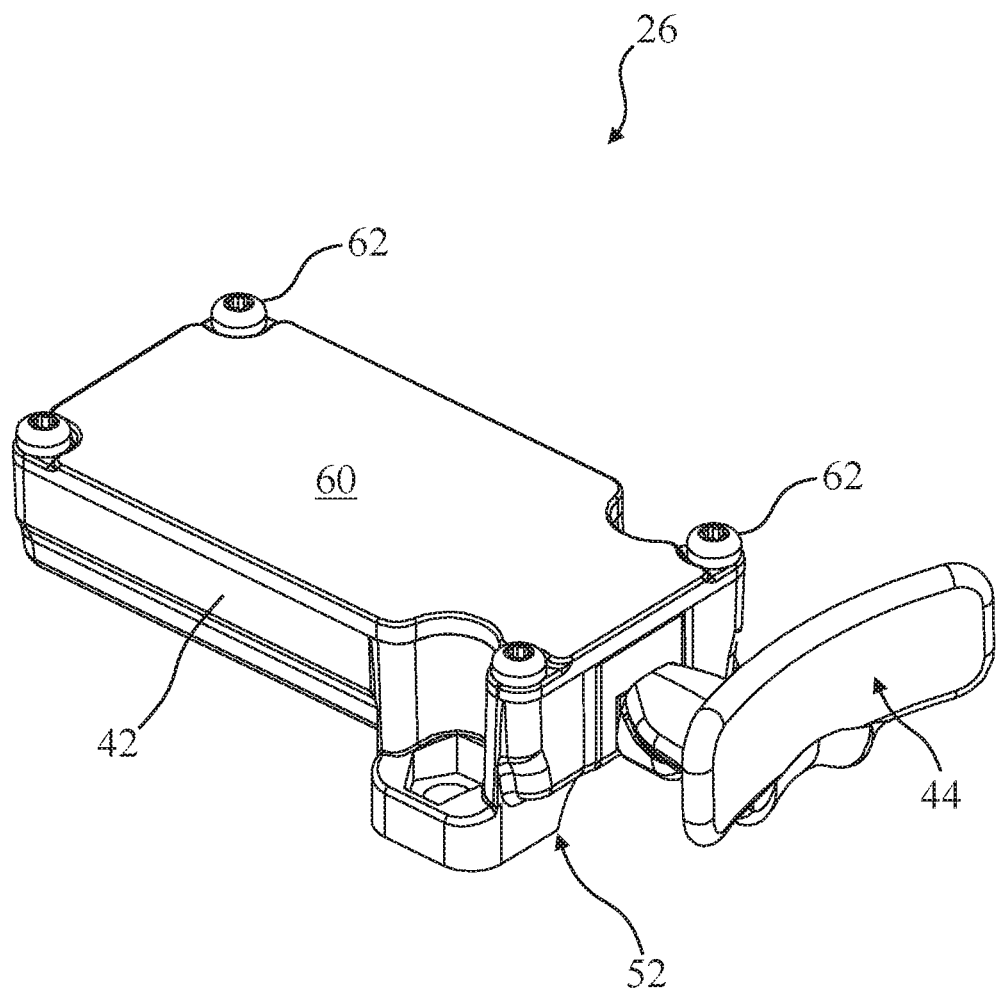
FIG. 5 is a perspective view of the throttle assembly of FIGS. 2A-4.

In the representative embodiments illustrated throughout the drawings, and as is best depicted in FIGS. 3-4, the control system 24 includes a collar 102 adapted for attachment to the handlebar 22 adjacent to the second grip element 40 to restrict axial movement of the second grip element 40 and the throttle assembly 26 along the grip axis GA (or, the handlebar axis HA) between the first grip element 38 and the collar 102. Here, the collar 102 has a clamp-like configuration and is configured to be removably secured to the handlebar 22 such that the collar 102 does not rotate relative to the grip axis GA (or, the handlebar axis HA) in operation.

As is best depicted in FIG. 4, the second grip element 40 comprises a grip region 104 disposed adjacent to the first grip element 38, and a mount region 106 operatively attached to the housing 42 of the throttle assembly 26. The mount region 106, like the mount 52 of the housing 42, has a generally semicircular "bearing block" configuration. Here, the mount 52 of the housing 42 and the mount region 106 of the second grip element 40 are configured to be releasably attached together, such as via fasteners (not shown), so as to promote rotation about the handlebar 22 relative to the first grip element 38. However, those having ordinary skill in the art will appreciate that the mount region 106 of the second grip element 40 and/or the mount 52 of the housing 42 could be configured in a number of different ways sufficient to rotate concurrently about the grip axis GA.

The first grip element 38 is shaped to provide support to the rider's hand during use, and the grip region 104 of the second grip element 40 is contoured and shaped to guide the rider's hand into position relative to the trigger 44 of the throttle assembly 26 and to promote enhanced comfort. While the second grip element 40 is formed as a unitary, one piece component, it will be appreciated that the first grip element 38 and/or the second grip element 40 could each be shaped, configured, or otherwise arranged in a number of different ways, from any suitable number of discrete components manufactured from the same or different materials, without departing from the scope of the present invention. By way of non-limiting example, the mount region 106 of the second grip element 40 could comprise a relatively rigid material, while the grip region 104 could comprise a relatively soft material.

As is best depicted in FIGS. 3-4, in the illustrated embodiment, the control system 24 includes a rotation dampener 108 disposed between the first grip element 38 and the second grip element 40 to impede rotation of the second grip element 40 between the first and second riding positions 40A, 40B. Put differently, the rotation dampener 108 allows rotation to occur while, at the same time, resisting free rotation of the second grip element 40 and the throttle assembly 26 relative to the first grip element 38. In the illustrated embodiment, the rotation dampener 108 has a generally annular configuration and is realized with a "thrust washer" configured to restrict but not prevent rotation during use. Here, it will be appreciated that the amount of rotation resistance afforded by the rotation dampener 108 can be adjusted to accommodate different applications by utilizing different materials and/or surface textures, and/or by adjusting the relative axial position of the collar 102 with respect to the first grip element 38 to adjust axial compression between the rotation dampener 108, the first grip element 38, and/or the second grip element 40.

Referring now to FIGS. 13-16C, in the illustrated embodiment, the control system 24 also comprises a detent mechanism, generally indicated at 110, interposed between the first grip element 38 and the second grip element 40, to interrupt rotation of the second grip element 40 relative to the first grip element 38. To this end, the detent mechanism 110 generally comprises a plunger 112 and an interface 114. The plunger 112 is coupled to the second grip element 40 for concurrent rotation between the first riding position 40A (see FIGS. 14A, 14C, and 16A) and the second riding position 40B (see FIGS. 14B, 14D, and 16C). In the embodiment illustrated in FIGS. 13-16C, the interface 114 is coupled to the first grip element 38 and defines a receptacle 116 shaped to receive the plunger 112 to interrupt rotation of the second grip element 40 relative to the first grip element 38. While the interface 114 is formed as a part of the first grip element 38 in this embodiment, it is conceivable that all or a part of the interface 114 could be formed in or otherwise defined by the handlebar 22.

Figure 16A:
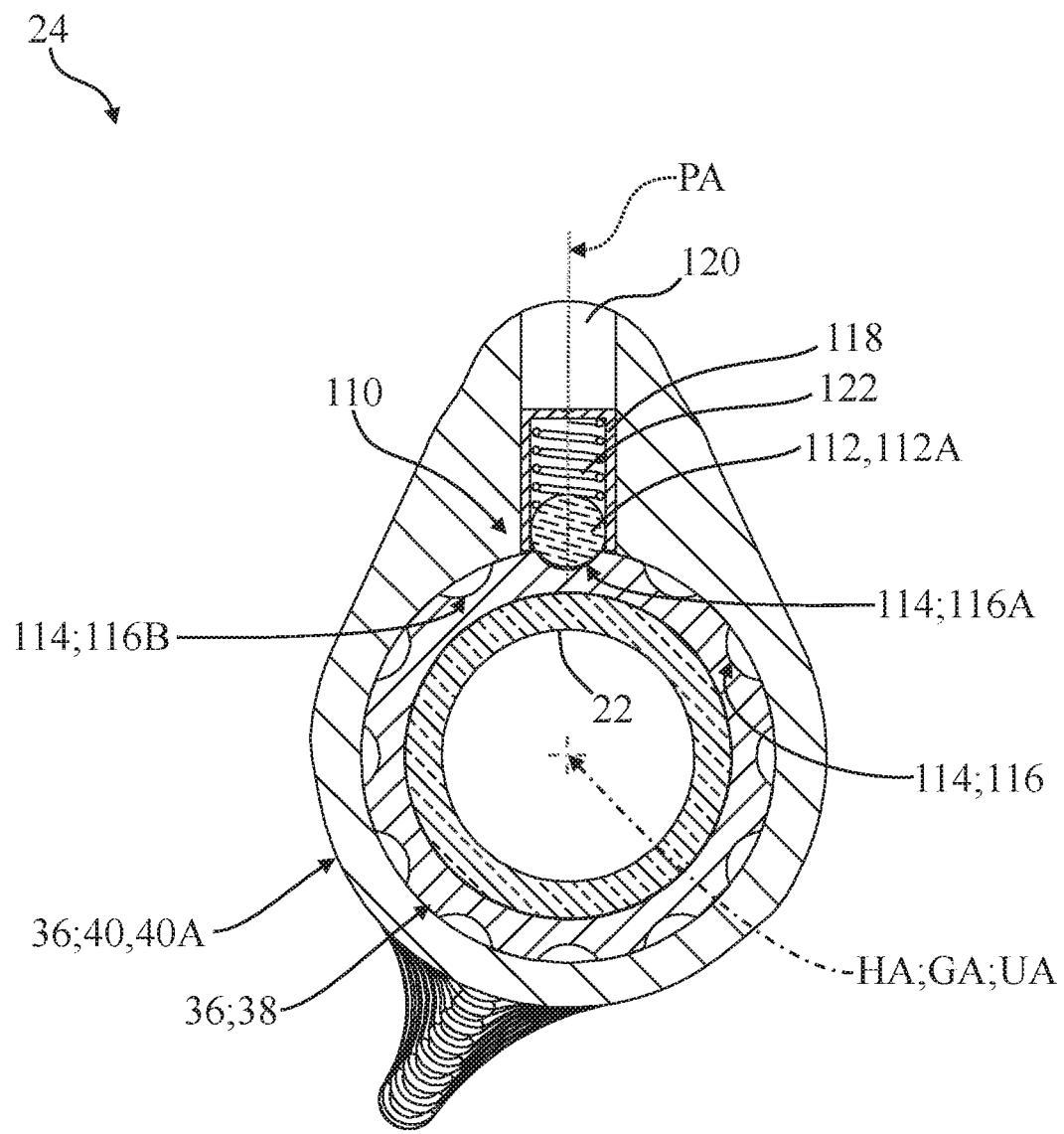
FIG. 16A is a section view taken along line 16-16 in FIG. 15, depicting the detent mechanism maintaining the second grip element in the first riding position.
Figure 16B:
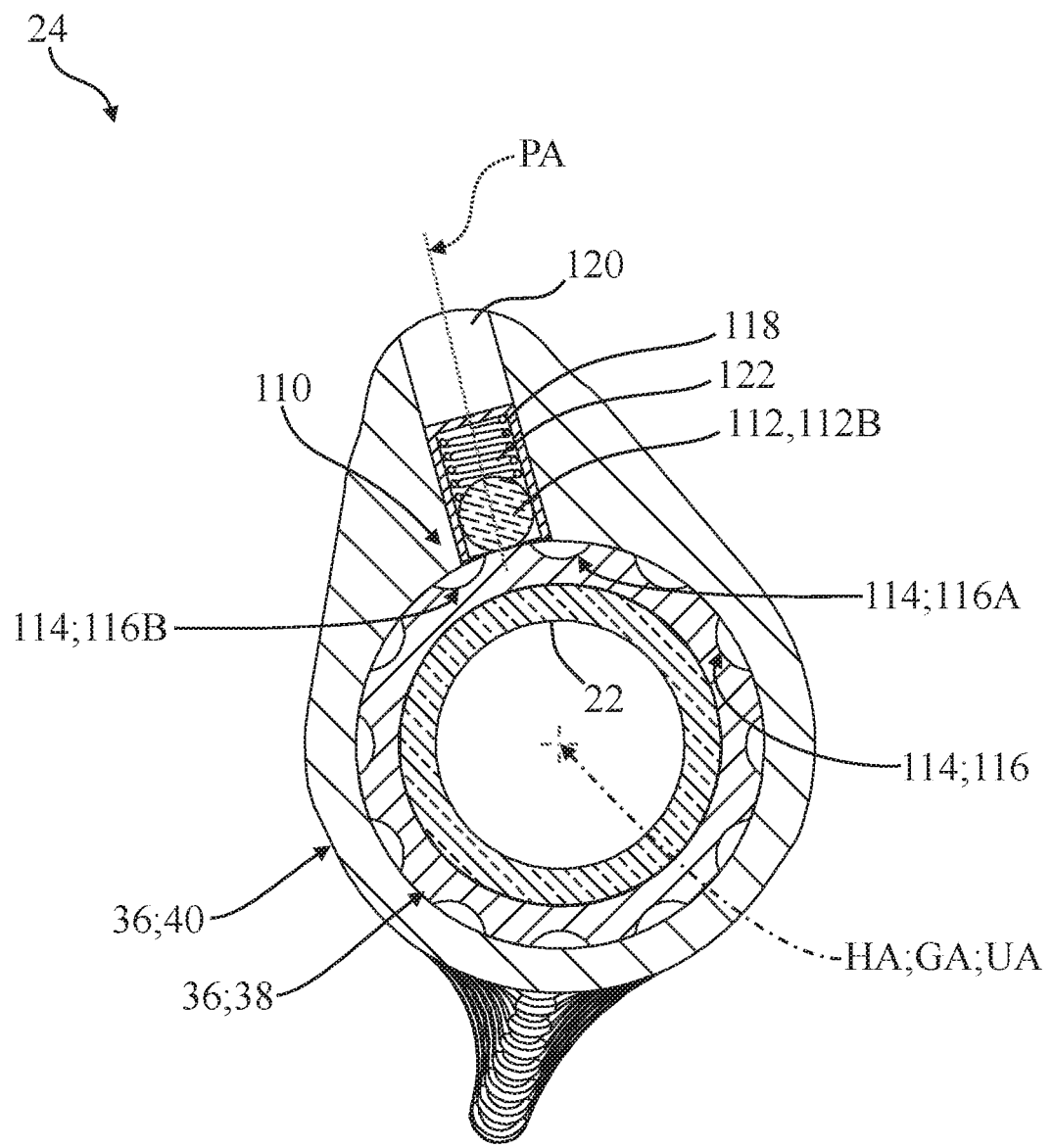
FIG. 16B is another section view of the portions of the control system shown in FIG. 16A, depicting operation of the detent mechanism with the second grip element rotating from the first riding position to the second riding position.
Figure 16C:
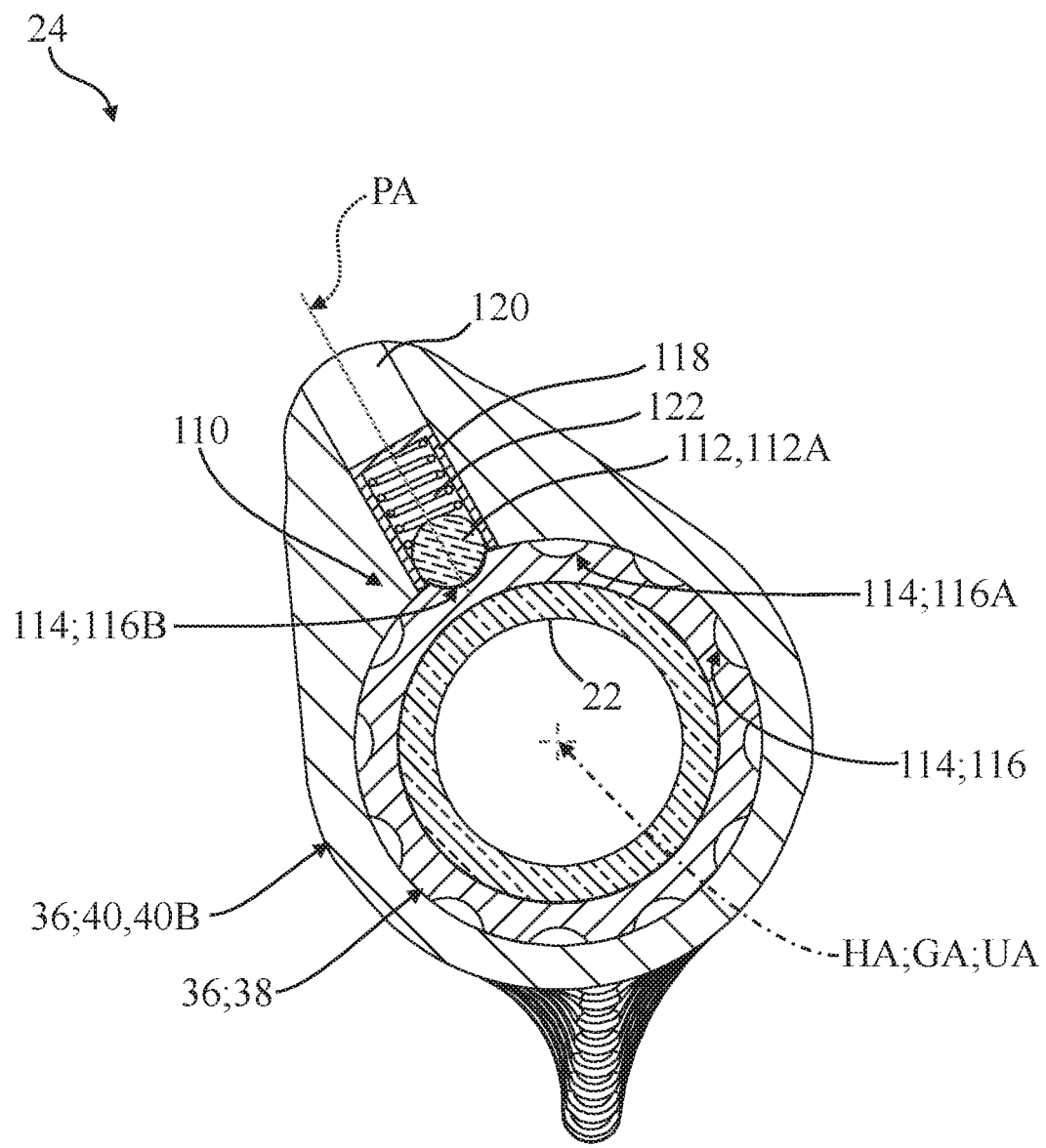
FIG. 16C is another section view of the portions of the control system shown in FIG. 16B, depicting the detent mechanism maintaining the second grip element in the second riding position.

As is best depicted in FIGS. 16A-16C, in one embodiment, the interface 114 of the detent mechanism 110 comprises a first receptacle 116A arranged to interrupt rotation of the second grip element 40 at the first riding position 40A (see FIG. 16A), and a second receptacle 116B arranged to interrupt rotation of the second grip element 40 at the second riding position 40B (see FIG. 16C). However, as noted above, the detent mechanism 110 could be provided with a single receptacle 116 to interrupt rotation of the second grip element 40 at one of either of the riding positions 40A, 40B. In the illustrated embodiment, a total of twelve receptacles 116 are provided.

This arrangement helps reduce the complexity of assembling the control system 24 and, at the same time, affords the rider with the ability to maintain the orientation of the throttle assembly 26 in more than two discrete riding positions. In the illustrated embodiment, the plunger 112 is supported for movement within a barrel 118 which, in turn, is supported within a grip aperture 120 formed in the second grip element 40. The plunger 112 has a generally spherical configuration and is arranged for movement between a first plunger position 112A engaged to one of the receptacles 116 to interrupt rotation of the second grip element 40 (see FIGS. 16A and 16C), and a second plunger position 112B disengaged from the receptacles 116 to permit rotation of the second grip element 40 relative to the first grip element 38 (see FIG. 16B). Here, the detent mechanism 110 also comprises a plunger biasing element 122 supported in the barrel 118, interposed between the plunger 112 and the second grip element 40 to urge the plunger from the second plunger position 112B (see FIG. 16B) toward the first plunger position 112A (see FIGS. 16A and 16C). In the illustrated embodiment, the plunger 112 is arranged for movement between the first and second plunger positions 112A, 112B along a plunger axis PA arranged transverse to the grip axis GA. However, those having ordinary skill in the art will appreciate that the plunger 112 could be arranged for movement in a number of different ways sufficient to limit rotation of the second grip element 40 or otherwise maintain one of the riding positions 40A, 40B.

The illustrated detent mechanism 110 is configured to "maintain" one of the riding positions 40A, 40B based on the engagement between the plunger 112 and the receptacle 116 via force exerted on the plunger 112 from the plunger biasing element 122. Here, the plunger biasing element 122 and/or the specific geometry of the plunger 112 and/or the interface 116 can be adjusted such that the selected riding position 40A, 40B is maintained during operation of the vehicle 20 until the rider wants to change between riding positions 40A, 40B. It will be appreciated that the first riding position 40A and/or the second riding position 40B could be defined in a number of different ways. By way of non-limiting example, the first riding position 40A could represent a "seated" position and the second trigger position 44B could represent a "standing" position. Additional riding positions could be provided between the first and second riding positions 40A, 40B, such as to accommodate one or more "crouching" or "partially upright" riding positions between the "sitting" and "standing" riding positions. To change between riding positions 40A, 40B, the rider can apply rotational force to the second grip element 40 sufficient to overcome the force exerted on the plunger 112 from the plunger biasing element 122, which moves the plunger 112 from the first plunger position 112A to the second plunger position 112B and allows the rider to rotate the second grip element 40 to a different riding position 40A, 40B. Those having ordinary skill in the art will appreciate that the detent mechanism 110 can be configured in a number of different ways sufficient to maintain one of the riding positions 40A, 40B described above. By way of non-limiting example, the detent mechanism 110 could also comprise a locking mechanism in certain embodiments (not shown) to lock the second grip element 40 in one of the riding positions 40A, 40B and require additional action on the part of the rider to change between riding positions 40A, 40B. Other configurations are contemplated.

As noted above, the present invention is also directed toward a method of operating a vehicle 20 having a handlebar 22, with a first grip element 38, a second grip element 40, and a throttle assembly 26 having a housing 42 and a trigger 44 to operate the vehicle 20. The method comprises the steps of: moving the trigger 44 relative to the housing 42 between a first trigger position 44A and a second trigger position 44B while the second grip element 40 is positioned relative to the first grip element 38 in a first riding position 40A; and rotating the second grip element 40, the housing 42, and the trigger 44 relative to the first grip element 38 from the first riding position 40A to a second riding position 40B independent of movement of the trigger 44 between the first and second trigger positions 44A, 44B. In one embodiment, the method also includes the step of rotating the second grip element 40, the housing 42, and the trigger 44 relative to the first grip element 38 from the second riding position 40B to the first riding position 40A independent of movement of the trigger 44 between the first and second trigger positions 44A, 44B. In one embodiment, the step of moving the trigger 44 occurs before the step of rotating the second grip element 40, the housing 42, and the trigger 44 to the second riding position 40B. In one embodiment, the step of moving the trigger 44 occurs after the step of rotating the second grip element 40, the housing 42, and the trigger 44 to the second riding position 40B. In one embodiment, the step of moving the trigger 44 occurs concurrent with the step of rotating the second grip element 40, the housing 42, and the trigger 44 to the second riding position 40B. Here too, it will be appreciated that the method of the present invention can be utilized in connection with different types of throttle assemblies beyond the throttle assembly 26 described in detail herein.

In this way, the control system 24, the throttle assembly 26, and the method of the present invention afford significant advantages in connection with vehicles 20 equipped with handlebars 22. Specifically, the electronic throttle assembly 26 allows the rider to move the thumb trigger 44 between the first and second trigger positions 44A, 44B in a way that follows natural movement of the thumb with respect to the index finger while, at the same time, allowing the rider to modulate vehicle speed in a simple, consistent, and reliable manner.

Furthermore, the control system 24 of the present invention significantly improves the rider's ability to maintain consistent engagement with the throttle assembly 36 in that the trigger 44 can be moved between the first and second trigger positions 44A, 44B and, at the same time, rotated concurrently with the second grip element 40 between the first and second riding positions 40A, 40B, without necessitating that the rider adjust their hand position relative to the throttle assembly 26 to compensate for the change in riding position. In light of the foregoing, it will be appreciated that the control system 24 and the throttle assembly 26 of the present invention provide improved functionality and usability in connection with handlebar-equipped vehicles 20 and, at the same time, reduce the cost and complexity of manufacturing and assembling throttle assemblies 26 which can operate reliably and predictably in a number of different environments.

The invention has been described in an illustrative manner, and it is to be understood that the terminology which has been used is intended to be in the nature of words of description rather than of limitation. Those having ordinary skill in the art will appreciate that many modifications and variations of the present invention are possible in light of the above teachings. It is, therefore, to be understood that the invention may be practiced otherwise than as specifically described.

What is claimed is:

1. A throttle assembly for a vehicle having a handlebar with a grip coupled to the handlebar and extending along a grip axis, said throttle assembly comprising:
    a housing having a mount adapted for attachment to the handlebar adjacent the grip with at least a portion of said housing defining a housing axis adapted to be substantially parallel to the grip axis;
    a link slidably supported by said housing and extending between a first link end and a second link end;
    a thumb trigger coupled to said first link end to concurrently move with said link between a first trigger position and a second trigger position; and
    a track mechanism operatively attached to said housing and to said second link end of said link to guide said second end of said link along a curvilinear path such that movement of said thumb trigger from said first trigger position to said second trigger position slides said thumb trigger away from said housing with said thumb trigger traversing said housing axis during at least a portion of said movement between said first trigger position and said second trigger position.

2. The throttle assembly as set forth in claim 1, further comprising a bushing coupled to said housing and slidably supporting said link between said first link end and said second link end.

3. The throttle assembly as set forth in claim 2, wherein said bushing is supported for rotation relative to said housing such that said movement of said thumb trigger effects translation of said link relative to said bushing and at least partially effects rotation of said bushing relative to said housing.

4. The throttle assembly as set forth in claim 2, wherein said bushing defines a bushing aperture shaped to slidably support said link for translation relative to said housing; and
wherein said link and said bushing aperture each have a generally cylindrical profile.

5. The throttle assembly as set forth in claim 1, wherein said link defines a link axis between said first link end and said second link end; and
wherein said track mechanism comprises:
a track member operatively attached to said housing and defining a slot, and
a slider operatively attached to said second link end of said link and engaging said slot to guide said second link end along said curvilinear path during said movement of said thumb trigger between said first trigger position and said second trigger position and to restrict rotation of said link about said link axis as said thumb trigger moves between said first trigger position and said second trigger position.

6. The throttle assembly as set forth in claim 5, wherein said slider is spaced laterally from said link axis; and
wherein said slider is arranged generally perpendicular to said link axis.

7. The throttle assembly as set forth in claim 5, wherein said slot has a curved profile to define said curvilinear path.

8. The throttle assembly as set forth in claim 5, wherein said track mechanism further comprises a carrier coupled to said second link end of said link; and
wherein said slider of said track mechanism is coupled to said carrier such that movement of said slider within said slot guides said carrier and said second link end of said link along said curvilinear path.

9. The throttle assembly as set forth in claim 8, further comprising:
an emitter operatively attached to said carrier for concurrent movement; and
a detector operatively attached to said housing for determining a position of said emitter as said thumb trigger moves between said first trigger position and said second trigger position.

10. The throttle assembly as set forth in claim 1, further comprising a biasing element arranged between said housing and said second link end of said link to bias said thumb trigger toward said first trigger position.

11. A throttle assembly for a vehicle having a handlebar with a grip coupled to the handlebar and extending along a grip axis, said throttle assembly comprising:
a housing having a mount adapted for attachment to the handlebar adjacent the grip;
a link slidably supported by said housing and extending along a link axis between a first link end and a second link end;
a thumb trigger coupled to said first link end to concurrently move with said link between a first trigger position and a second trigger position; and
a track mechanism operatively attached to said housing and to said second link end of said link with said track mechanism comprising:
a track member formed integrally with said housing and defining a slot, and
a slider operatively attached to said second link end of said link and engaging said slot to guide said second link end as said thumb trigger moves between said first trigger position and said second trigger position and to restrict rotation of said link about said link axis as said thumb trigger moves between said first trigger position and said second trigger position.

12. The throttle assembly as set forth in claim 11, wherein said slot and said slider of said track mechanism are arranged to guide said second link end of said link along a path such that movement from said first trigger position to said second trigger position slides said thumb trigger away from said housing.

13. The throttle assembly as set forth in claim 12, wherein said path is generally linear.

14. The throttle assembly as set forth in claim 12, wherein at least a portion of said housing defines a housing axis adapted to be substantially parallel to the grip axis; and
wherein said path is curvilinear such that movement from said first trigger position to said second trigger position moves said thumb trigger transverse to said housing axis during at least a portion of said movement between said first trigger position and said second trigger position.

15. The throttle assembly as set forth in claim 11, further comprising a bushing coupled to said housing and slidably supporting said link between said first link end and said second link end.

16. The throttle assembly as set forth in claim 15, wherein said bushing is supported for rotation relative to said housing such that said movement of said thumb trigger effects translation of said link relative to said bushing and at least partially effects rotation of said bushing relative to said housing.

17. The throttle assembly as set forth in claim 15, wherein said bushing defines a bushing aperture shaped to slidably support said link for translation relative to said housing; and
wherein said link and said bushing aperture each have a generally cylindrical profile.

18. The throttle assembly as set forth in claim 11, wherein said slider is spaced laterally from said link axis; and
wherein said slider is arranged generally perpendicular to said link axis.

19. The throttle assembly as set forth in claim 11, wherein said slot has a curved profile to guide said thumb trigger along a curvilinear path.

20. The throttle assembly as set forth in claim 11, wherein said slot has a linear profile to guide said thumb trigger along a linear path.

21. The throttle assembly as set forth in claim 11, wherein said track mechanism further comprises a carrier coupled to said second link end of said link; and
wherein said slider of said track mechanism is coupled to said carrier such that movement of said slider within said slot guides said carrier and said second link end of said link along a path.

22. The throttle assembly as set forth in claim 21, further comprising:
an emitter operatively attached to said carrier for concurrent movement; and
a detector operatively attached to said housing for determining a position of said emitter as said thumb trigger moves between said first trigger position and said second trigger position.

23. The throttle assembly as set forth in claim 11, further comprising a biasing element arranged between said housing and said second link end of said link to bias said thumb trigger toward said first trigger position.

24. A control system for a vehicle having a handlebar extending along a handlebar axis to a handlebar end, said control system comprising:
- a first grip element adapted for attachment to the handlebar adjacent to the handlebar end, with said first grip element defining a grip axis;
- a second grip element adapted for rotatable attachment to the handlebar, with said second grip element being rotatable about said grip axis relative to said first grip element between a first riding position and a second riding position for adjusting a position of said second grip element without actuating a throttle of the vehicle;
- a throttle assembly having a housing and a trigger with said trigger movable relative to said housing between a first trigger position and a second trigger position, said housing being operatively attached to said second grip element to concurrently rotate between said first riding position and said second riding position, said trigger being movable between said first trigger position and said second trigger position independent of rotation between said first riding position and said second riding position for actuating the throttle of the vehicle.

25. The control system as set forth in claim 24, further comprising a collar adapted for attachment to the handlebar adjacent to said second grip element to restrict axial movement of said second grip element along said grip axis between said first grip element and said collar.

26. The control system as set forth in claim 24, further comprising a rotation dampener disposed between said first grip element and said second grip element to impede rotation of said second grip element between said first riding position and said second riding position.

27. The control system as set forth in claim 24, further comprising a detent mechanism interposed between said first grip element and said second grip element to interrupt rotation of said second grip element relative to said first grip element, wherein said detent mechanism comprises:
- a plunger coupled to said second grip element for concurrent rotation between said first riding position and said second riding position, and
- an interface coupled to said first grip element and defining a receptacle shaped to receive said plunger to interrupt rotation of said second grip element relative to said first grip element.

28. The control system as set forth in claim 27, wherein said interface of said detent mechanism comprises a first receptacle arranged to interrupt rotation of said second grip element at said first riding position, and a second receptacle arranged to interrupt rotation of said second grip element at said second riding position; and
- wherein said plunger is arranged for movement between a first plunger position engaged to said receptacle to interrupt rotation of said second grip element, and a second plunger position disengaged from said receptacle to permit rotation of said second grip element relative to said first grip element.

29. The control system as set forth in claim 28, wherein said detent mechanism further comprises a plunger biasing element interposed between said plunger and said second grip element to urge said plunger from said second plunger position toward said first plunger position.

30. The control system as set forth in claim 24, wherein said second grip element is positioned between said first grip element and said housing.

31. A method of operating a vehicle having a throttle and a handlebar, with a first grip element, a second grip element, and a throttle assembly having a housing and a trigger to operate the vehicle, said method comprising the steps of:
- moving the trigger relative to the housing between a first trigger position and a second trigger position while the second grip element is positioned relative to the first grip element in a first riding position for actuating the throttle of the vehicle; and
- rotating the second grip element, the housing, and the trigger relative to the first grip element from the first riding position to a second riding position independent of movement of the trigger between the first trigger position and the second trigger position without actuating the throttle of the vehicle.

\* \* \* \* \*